US005870716A

United States Patent [19]

Sugiyama et al.

[11] Patent Number: 5,870,716

[45] Date of Patent: Feb. 9, 1999

[54] HOME TERMINAL AND SHOPPING SYSTEM

[75] Inventors: Taichi Sugiyama, Kanagawa-ken; Yukio Akimoto; Takafumi Morimoto, both of Hadano; Yoshiyuki Tsuge, Zama, all of Japan

[73] Assignee: Hitachi, Ltd., Tokyo, Japan

[21] Appl. No.: 538,643

[22] Filed: Oct. 4, 1995

[30] Foreign Application Priority Data

Oct. 6, 1994 [JP] Japan .................................... 6-243011
Jul. 11, 1995 [JP] Japan .................................... 7-174540

[51] Int. Cl.[6] ........................... G06F 17/60; G06F 153/00

[52] U.S. Cl. .................................. 705/26; 705/8; 705/10; 705/16; 705/20; 705/21; 705/22; 705/24; 705/28; 235/383

[58] Field of Search .................................... 395/214, 216, 395/217, 218, 220, 221, 222, 223, 224, 225, 226, 227, 228, 229, 230, 233, 234, 235, 239, 241; 705/14, 16–18, 20–30, 33–35, 39, 41, 8, 10, 28; 235/375, 378, 379, 380, 381, 383, 385; 902/22, 24, 25, 26, 27

[56] References Cited

U.S. PATENT DOCUMENTS

| | | | |
|---|---|---|---|
| 4,689,478 | 8/1987 | Hale et al. | 235/380 |
| 4,739,295 | 4/1988 | Hayashi et al. | 235/379 |
| 4,868,376 | 9/1989 | Lessin et al. | 235/492 |
| 5,047,614 | 9/1991 | Bianco | 235/385 |
| 5,214,269 | 5/1993 | Yamashita et al. | 235/379 |
| 5,250,789 | 10/1993 | Johnsen | 395/214 |
| 5,324,922 | 6/1994 | Roberts | 235/375 |
| 5,424,524 | 6/1995 | Ruppert et al. | 395/208 |
| 5,544,040 | 8/1996 | Gerbaulet | 395/226 |

FOREIGN PATENT DOCUMENTS

| | | |
|---|---|---|
| 0 356237 A2 | 2/1990 | European Pat. Off. . |
| 0 623 904 A1 | 11/1994 | European Pat. Off. . |
| 3-122691 | 5/1991 | Japan . |
| 5-9452 | 4/1993 | Japan . |

OTHER PUBLICATIONS

Dialog File 148, Acc. No. 05891831: Charles E. Morris, "Supersegmentation Partnering for Profits . . . " *Food Engineering* v.64. n.5. p. 107 (8) (8 pages), May 1992.

Dialog File 608, Acc. #00120150: Andrew Cassel: "Philadelphia Company Unveils New Generation of Cashless Machines" *Philadelphia Inquirer*, Oct. 16, 1992 (Newspaper Article) (2 pages).

Dialog File 772, Acc. No. 13171123: USA: Open Market, Inc. First to Offer Complete End–to–End Solution for Electronic Commerce: Businesswire, Oct. 24, 1994 (6 pages).

Dialog File 710, Acc. No. 08116981: Christopher Lloyd & Steve Boxer "Intelligent Dustbin Learns to Do Shopping . . . " Times of London, Nov. 6, 1994.

*Primary Examiner*—Joseph Thomas
*Attorney, Agent, or Firm*—Antonelli, Terry, Stout & Kraus, LLP

[57] ABSTRACT

A shopping system includes store terminals for registering purchase and sale of items, a store processor for collectively managing the store terminals, electronic shelf labels capable of setting classification, etc., of the items, an item information data base for storing the classification of the items and the electronic shelf labels from information from the electronic shelf labels in such a manner as to correspond to each other, and home terminals for executing edition from the information from the store terminal or the store processor by a predetermined logic. The home terminal in this system accumulates the item information from the store terminal as history, determines a mean purchase interval of individual items, and decides and notifies the items to be purchased to the shopper by purchase item determination process of a next shopping day and a next-of-next shopping day inputted by the shopper.

11 Claims, 18 Drawing Sheets

FIG. 2

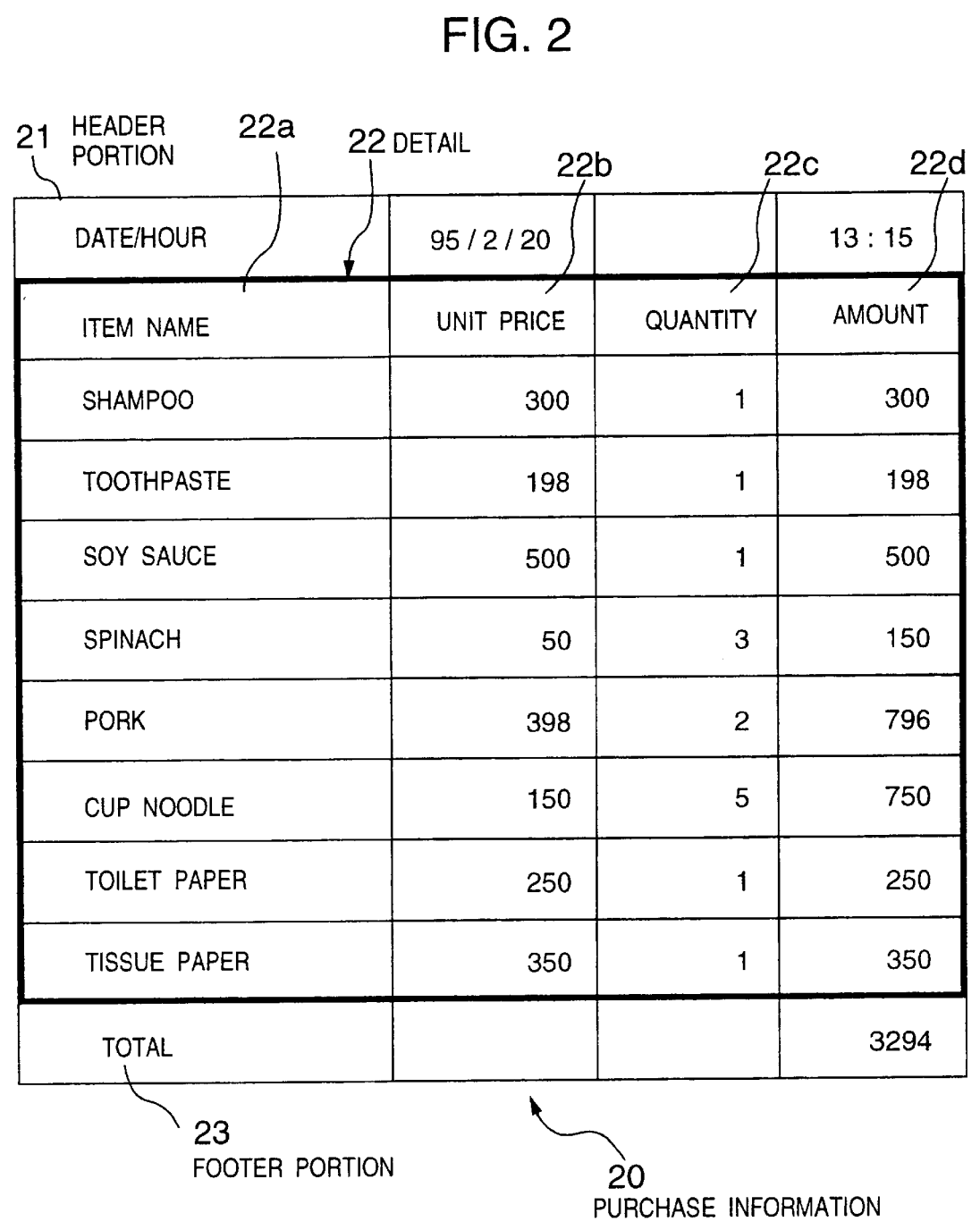

| DATE/HOUR | 95 / 2 / 20 | | 13 : 15 |
|---|---|---|---|
| ITEM NAME | UNIT PRICE | QUANTITY | AMOUNT |
| SHAMPOO | 300 | 1 | 300 |
| TOOTHPASTE | 198 | 1 | 198 |
| SOY SAUCE | 500 | 1 | 500 |
| SPINACH | 50 | 3 | 150 |
| PORK | 398 | 2 | 796 |
| CUP NOODLE | 150 | 5 | 750 |
| TOILET PAPER | 250 | 1 | 250 |
| TISSUE PAPER | 350 | 1 | 350 |
| TOTAL | | | 3294 |

FIG. 6

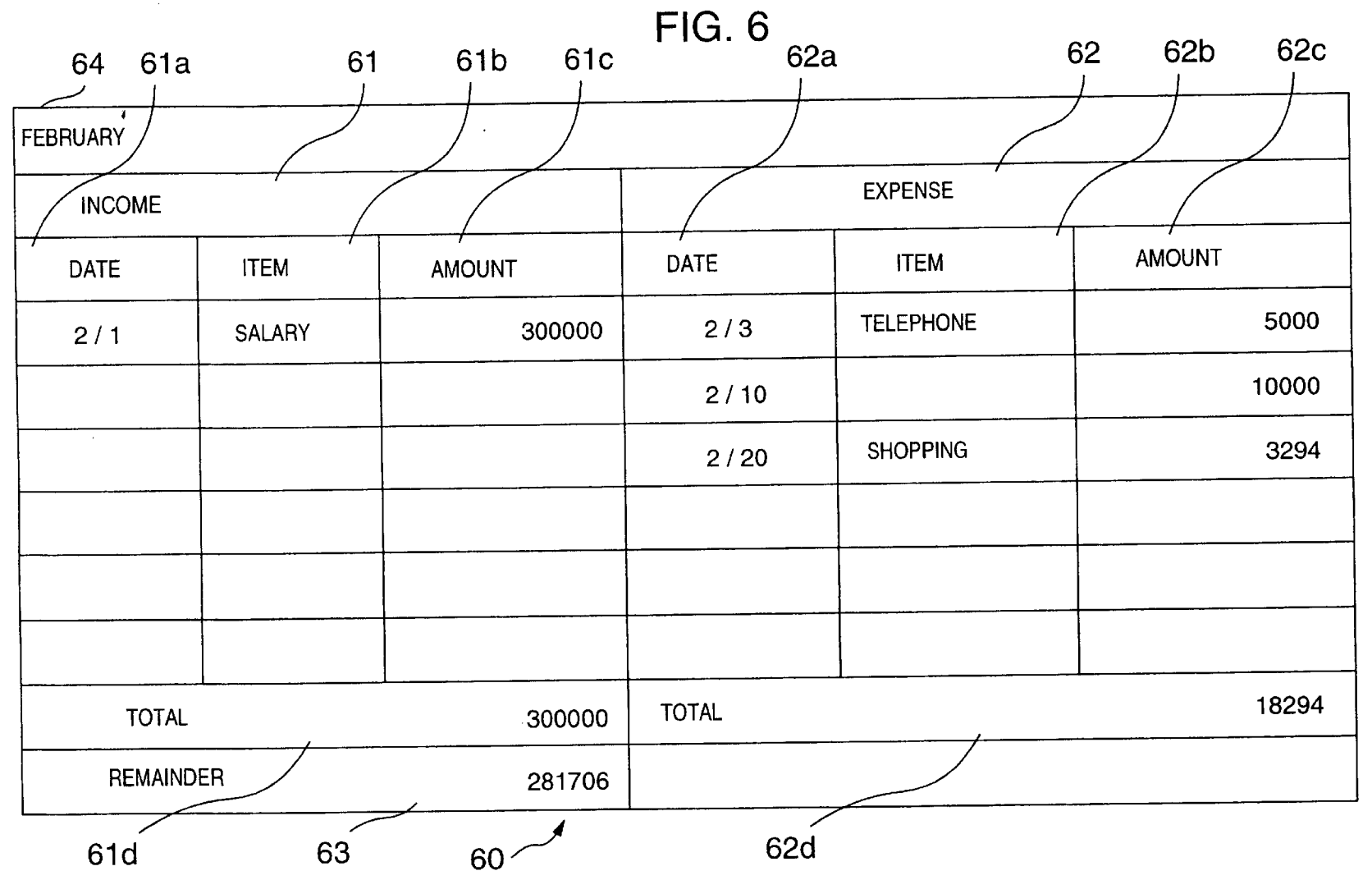

| FEBRUARY | | | | | |
|---|---|---|---|---|---|
| INCOME | | | EXPENSE | | |
| DATE | ITEM | AMOUNT | DATE | ITEM | AMOUNT |
| 2 / 1 | SALARY | 300000 | 2 / 3 | TELEPHONE | 5000 |
| | | | 2 / 10 | | 10000 |
| | | | 2 / 20 | SHOPPING | 3294 |
| | | | | | |
| | | | | | |
| | | | | | |
| TOTAL | | 300000 | TOTAL | | 18294 |
| REMAINDER | | 281706 | | | |

| ITEM NAME | PREVIOUS PURCHASE DATE | MEAN PURCHASE INTERVAL (DAY) |
|---|---|---|
| SHAMPOO | 2 / 20 | 50 |
| TOOTHPASTE | 2 / 20 | 20 |
| SOY SAUCE | 2 / 20 | 30 |
| SPINACH | 2 / 20 | 3 |
| PORK | 2 / 20 | 2 |
| CUP NOODLE | 2 / 20 | 7 |
| TOILET PAPER | 2 / 20 | 15 |
| TISSUE PAPER | 2 / 20 | 25 |
| HAIR LIQUID | 2 / 30 | 60 |
| HAIR RINSE | 2 / 30 | 80 |
| MISO | 2 / 10 | 40 |
| SUGAR | 2 / 10 | 35 |
| SALT | 2 / 1 | 55 |

| NEXT SHOPPING DAY | 3 / 20 | NEXT-OF-NEXT SHOPPING DAY | 4 / 10 | | |
|---|---|---|---|---|---|
| ITEM NAME | PREVIOUS SHOPPING DATE | MEAN SHOPPING INTERVAL (DAY) | SHOPPING APPLICANT ITEM | PRESENT STOCK STATUS | PURCHASE DECISION |
| SHAMPOO (A) | 2 / 20 | 50 | × | ○ | × |
| TOOTHPASTE (A) | 2 / 20 | 20 | ○ | ○ | ○ |
| SOY SAUCE | 2 / 20 | 30 | ○ | ○ | ○ |
| SPINACH | 2 / 20 | 3 | ○ | ○ | ○ |
| PORK | 2 / 20 | 2 | ○ | ○ | ○ |
| CUP NOODLE | 2 / 20 | 7 | ○ | ○ | ○ |
| TOILET PAPER | 2 / 20 | 15 | ○ | ○ | ○ |
| TISSUE PAPER | 2 / 20 | 25 | ○ | × | ○ |
| HAIR LIQUID | 2 / 30 | 60 | × | × | ○ |
| HAIR RINSE | 2 / 30 | 80 | × | ○ | × |
| MISO | 2 / 10 | 40 | ○ | ○ | ○ |
| SUGAR | 2 / 10 | 35 | ○ | ○ | ○ |
| SALT | 2 / 1 | 55 | ○ | ○ | ○ |

FIG. 11

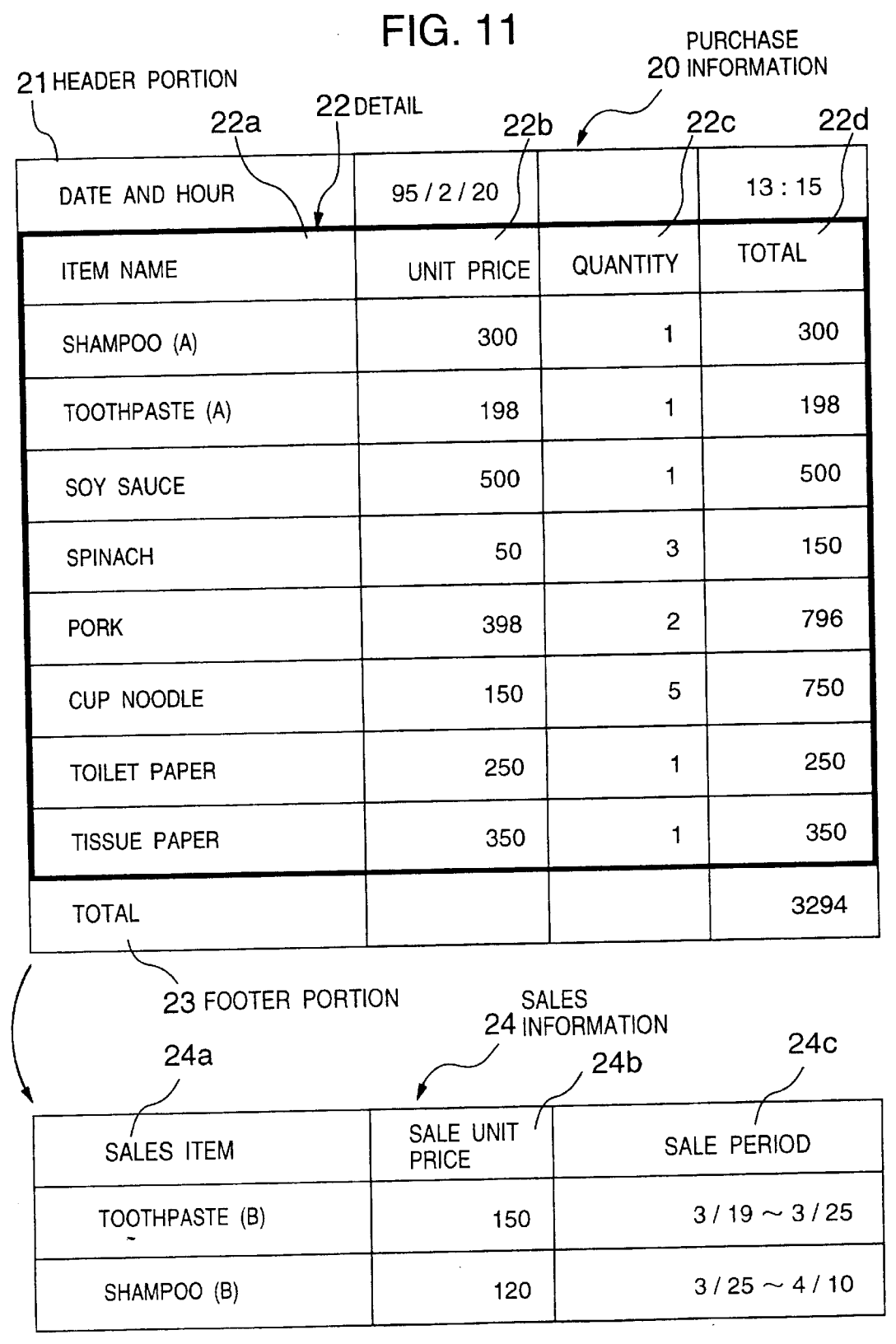

| DATE AND HOUR | 95 / 2 / 20 | | 13 : 15 |
|---|---|---|---|
| ITEM NAME | UNIT PRICE | QUANTITY | TOTAL |
| SHAMPOO (A) | 300 | 1 | 300 |
| TOOTHPASTE (A) | 198 | 1 | 198 |
| SOY SAUCE | 500 | 1 | 500 |
| SPINACH | 50 | 3 | 150 |
| PORK | 398 | 2 | 796 |
| CUP NOODLE | 150 | 5 | 750 |
| TOILET PAPER | 250 | 1 | 250 |
| TISSUE PAPER | 350 | 1 | 350 |
| TOTAL | | | 3294 |

| SALES ITEM | SALE UNIT PRICE | SALE PERIOD |
|---|---|---|
| TOOTHPASTE (B) | 150 | 3 / 19 ~ 3 / 25 |
| SHAMPOO (B) | 120 | 3 / 25 ~ 4 / 10 |

| ITEM NAME | PREVIOUS PURCHASE DATE | MEAN PURCHASE INTERVAL (DAY) | PREVIOUS PURCHASE UNIT PRICE |
|---|---|---|---|
| SHAMPOO (A) | 2 / 20 | 50 | 300 |
| TOOTHPASTE (A) | 2 / 20 | 20 | 198 |
| SOY SAUCE | 2 / 20 | 30 | 500 |
| SPINACH | 2 / 20 | 3 | 50 |
| PORK | 2 / 20 | 2 | 398 |
| CUP NOODLE | 2 / 20 | 7 | 150 |
| TOILET PAPER | 2 / 20 | 15 | 250 |
| TISSUE PAPER | 2 / 20 | 25 | 350 |
| HAIR LIQUID | 2 / 30 | 60 | 500 |
| HAIR RINSE | 2 / 30 | 80 | 500 |
| MISO | 2 / 10 | 40 | 300 |
| SUGAR | 2 / 10 | 35 | 250 |
| SALT | 2 / 1 | 55 | 150 |

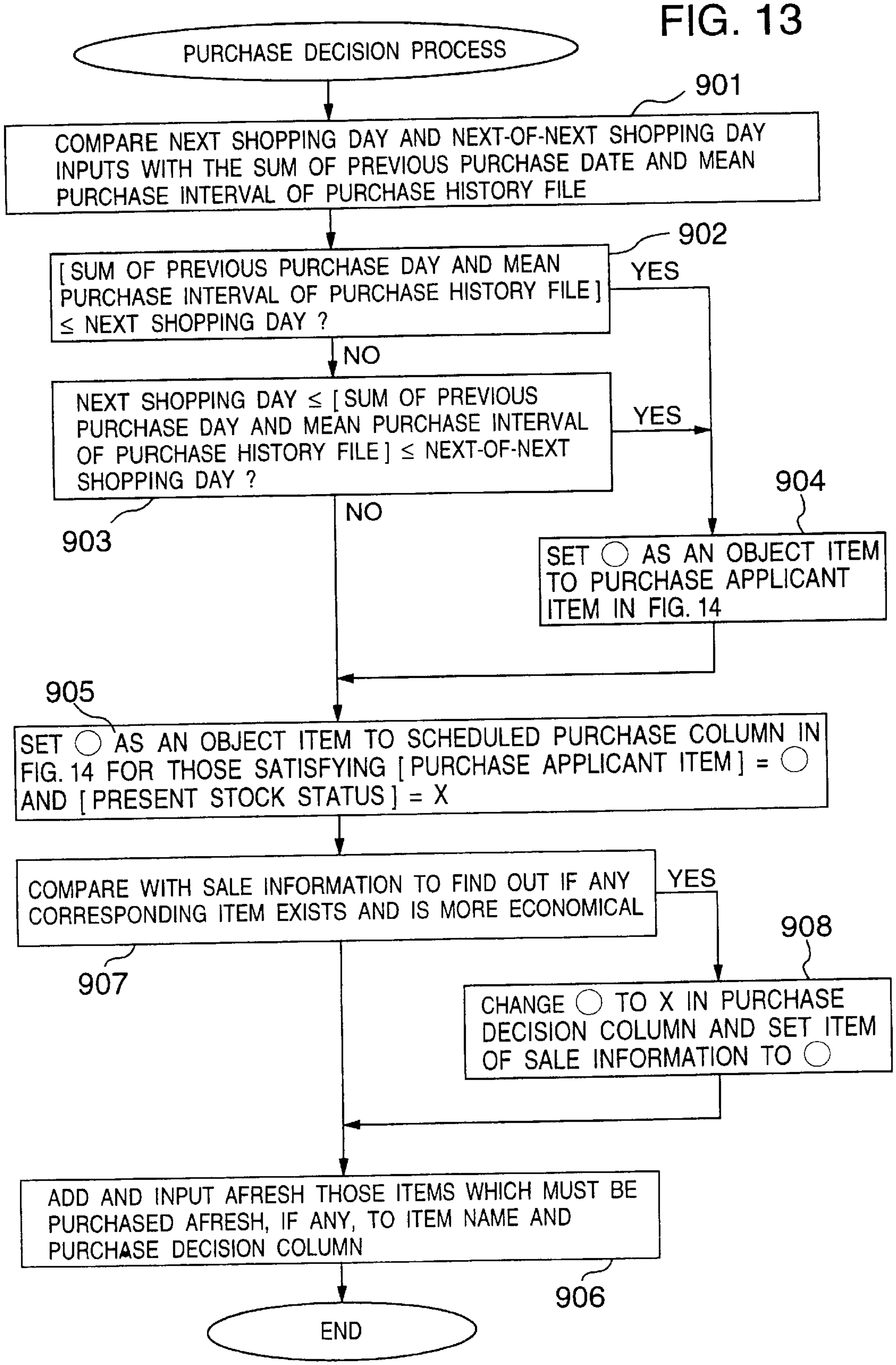
FIG. 13
PURCHASE DECISION PROCESS
901
COMPARE NEXT SHOPPING DAY AND NEXT-OF-NEXT SHOPPING DAY INPUTS WITH THE SUM OF PREVIOUS PURCHASE DATE AND MEAN PURCHASE INTERVAL OF PURCHASE HISTORY FILE
902
[ SUM OF PREVIOUS PURCHASE DAY AND MEAN PURCHASE INTERVAL OF PURCHASE HISTORY FILE ] ≤ NEXT SHOPPING DAY ?
YES
NO
NEXT SHOPPING DAY ≤ [ SUM OF PREVIOUS PURCHASE DAY AND MEAN PURCHASE INTERVAL OF PURCHASE HISTORY FILE ] ≤ NEXT-OF-NEXT SHOPPING DAY ?
YES
NO
903
904
SET ○ AS AN OBJECT ITEM TO PURCHASE APPLICANT ITEM IN FIG. 14
905
SET ○ AS AN OBJECT ITEM TO SCHEDULED PURCHASE COLUMN IN FIG. 14 FOR THOSE SATISFYING [ PURCHASE APPLICANT ITEM ] = ○ AND [ PRESENT STOCK STATUS ] = X
COMPARE WITH SALE INFORMATION TO FIND OUT IF ANY CORRESPONDING ITEM EXISTS AND IS MORE ECONOMICAL
YES
907
908
CHANGE ○ TO X IN PURCHASE DECISION COLUMN AND SET ITEM OF SALE INFORMATION TO ○
ADD AND INPUT AFRESH THOSE ITEMS WHICH MUST BE PURCHASED AFRESH, IF ANY, TO ITEM NAME AND PURCHASE DECISION COLUMN
906
END

| NEXT SHOPPING DAY | 3 / 20 | | NEXT-OF-NEXT SHOPPING DAY | 4 / 10 | | |
|---|---|---|---|---|---|---|
| ITEM NAME | PREVIOUS PURCHASE DATE | PREVIOUS PURCHASE UNIT PRICE | MEAN PURCHASE INTERVAL (DAY) | PURCHASE APPLICANT ITEM | PRESENT STOCK STATUS | PURCHASE DECISION |
| SHAMPOO (A) | 2 / 20 | 300 | 50 | × | o | × |
| TOOTHPASTE (A) | 2 / 20 | 198 | 20 | o | o | × |
| SOY SAUCE | 2 / 20 | 500 | 30 | o | o | o |
| SPINACH | 2 / 20 | 50 | 3 | o | o | o |
| PORK | 2 / 20 | 398 | 2 | o | o | o |
| CUP NOODLE | 2 / 20 | 150 | 7 | o | o | o |
| TOILET PAPER | 2 / 20 | 250 | 15 | o | o | o |
| TISSUE PAPER | 2 / 20 | 350 | 25 | o | × | o |
| HAIR LIQUID | 2 / 30 | 500 | 60 | × | × | o |
| HAIR RINSE | 2 / 30 | 500 | 80 | × | o | × |
| MISO | 2 / 10 | 300 | 40 | o | o | o |
| SUGAR | 2 / 10 | 250 | 35 | o | o | o |
| SALT | 2 / 1 | 150 | 55 | o | o | o |

| SALES ITEMS | | SALES UNIT PRICE | | | | PURCHASE DECISION | SALE PERIOD |
|---|---|---|---|---|---|---|---|
| SHAMPOO (B) | | 120 | | | | × | 3 / 25 ~ 4 / 10 |
| TOOTHPASTE (B) | | 150 | | | | o | 3 / 19 ~ 3 / 25 |

24a 24b

1 STORE
POS TERMINAL
2
5
IC CARD CONTROLLER
RECEIPT PRINTER
3
6
IC CARD
4 RECEIPT PAPER
15 DISPLAY
19 HANDY TERMINAL
14
IC CARD CONTROLLER
PRINT-ER
16
KEYBOARD
17
18 PRINTER SHEET

FIG. 16
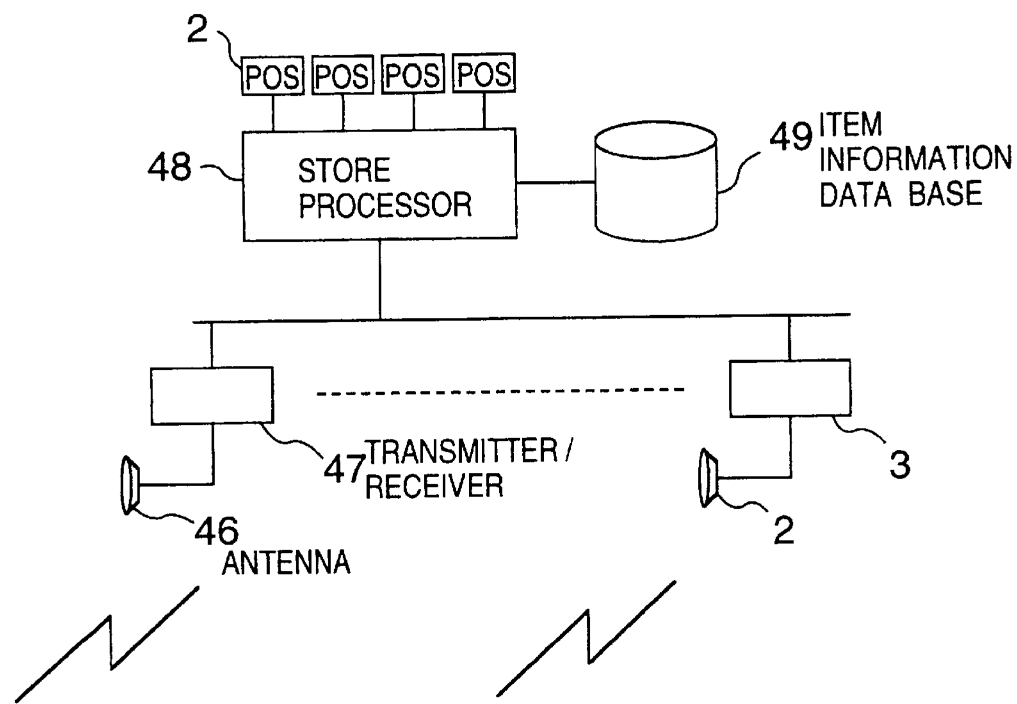
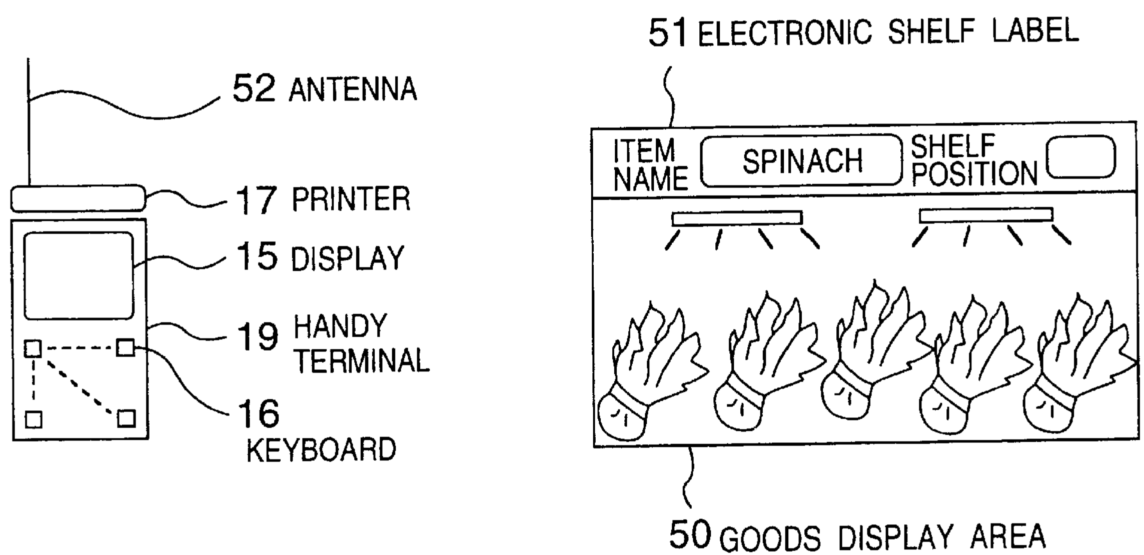

| GROUP ITEM | ITEM | GOODS DISPLAY AREA |
|---|---|---|
| VEGETABLE | SPINACH | 1F - A |
| VEGETABLE | CARROT | 1F - A |
| VEGETABLE | : | : |
| VEGETABLE | : | : |
| DRY FOOD | LAVOR | 1F - B |
| DRY FOOD | WAKAME | 1F - B |
| DRY FOOD | SHIITAKE | 1F - B |
| DRY FOOD | : | : |
| DRY FOOD | : | : |
| CERAMIC WARE | BOWL | 2F - A |
| CERAMIC WARE | TEACUP | 2F - A |
| CERAMIC WARE | : | : |
| CERAMIC WARE | : | : |
| : | : | : |

HOME TERMINAL AND SHOPPING SYSTEM

BACKGROUND OF THE INVENTION

When a consumer (shopper) goes shopping in a discount store, etc., the shopper keeps home balance sheet management by receiving a receipt slip at the store, takes it back home and posts the content into the home balance sheet or inputs it into a spreadsheet software of a personal computer by typing. When buying a large quantity of items every week, the shopper examines any items which are lacking and determines the items to be purchased.

When the purchased items are posted into the home balance sheet or are inputted directly into the personal computer by typing, a posting error or a typing error is likely to occur, and the this operation itself is time-consuming.

Therefore, JP-A-1-120665 discloses a technique relating to the home balance sheet. According to this prior art reference, a POS (Point of Sale) terminal in a store, a computer of a bank and a home terminal are connected, and when a user bearing an ID card draws a cash from a bank terminal, the computer of the bank is connected to the home terminal in accordance with a telephone number in the ID card so as to post the amount into the income of the home balance sheet. Similarly, when the user purchases any items by the POS terminal, the amount is posted to the expenses of the home balance sheet of the home terminal. Though this automatic home balance sheet generation system automatically manages the home balance sheet by using the POS terminal, the IC card, and so forth, it only supplements management of the home balance sheet but cannot assist the shopper to decide the purchase of items and cannot prevent oversight of the items to be purchased or overlapping purchase of items when the shopper habitually makes shopping.

When shopping ordinarily in a discount store, a department store, etc, handling large quantities of items, the shopper searches the item he desires to purchase while looking up a memorandum. Therefore, the shopper has to move in all directions and a great deal of time and labor is necessary before he can purchase the desired items, so that congestion in the store is unavoidable.

SUMMARY OF THE INVENTION

According to the present invention, there is provided a shopping system which eliminates the problems described above, automatically executes home balance sheet management and scheduled purchase management, and makes it possible for a shopper to rationally purchase in a discount store, a department store, and so forth.

It is a first object of the present invention to eliminate the shopper's trouble of posting the shopping content from a receipt slip to a home balance sheet or the trouble of inputting to a personal computer by typing, to simultaneously eliminate an input error, and to accomplish labor saving and higher accuracy in home balance sheet management.

It is a second object of the present invention to prevent oversight of purchase items or overlapping purchase by a shopper when the shopper habitually makes shopping and to enable him to purchase proper items.

It is a third object of the present invention to assist a shopper to decide purchase planning of items on the basis of history information of purchase in the past and to establish a correct purchase planning for purchasing items more rationally and more economically by taking sale information of sales items into consideration.

It is a fourth object of the present invention to make smooth the flow of shoppers inside a store, to prevent congestion and to reduce the number of man-hours necessary for attending to shoppers.

According to the present invention, the first object described above can be accomplished by a system wherein a store terminal for registering item information such as purchase information of items transmits the item information to a home terminal mainly used at home through an IC card or by wireless, and the item information is edited by the home terminal. In other words, when a shopper purchases an item or items in a store, the IC card of the shopper is connected to the store terminal so as to write the item information to the IC card, and the home terminal reads and builds up this item information from the IC card and edits the information as a file for a home balance sheet. However, the information can be transferred by wireless, etc., (the transmission line to be connected electrically is the same) without using the IC card, and a portable terminal such as a handy terminal can be used in place of the home terminal such as the personal computer (hereinafter the same).

The second object described above can be accomplished by the system wherein the home terminal determines a mean purchase interval from the past till the present on the basis of purchase history of each item from the item information that has been built up, and edits a shopping list by a logic which determines the list of items to be purchased from the next shopping day or the next-of-next shopping day in combination with the present or next stock status of the item.

Further, the third object described above can be accomplished by a system wherein sale information, etc., relating to sale or bargain sale of items is read from the store terminal storing such an information into the IC card, and the home terminal which reads this IC card considers the items on the next-of-next shopping day from this sale information and edits the shopping list by a logic for determining the items to be purchased.

The fourth object described above can be accomplished by a system wherein classifications of items such as group items and items in a store and item show areas corresponding to the item groups are stored in such a manner as to correspond to one another, and when a specific item group is received from a shopper side, the item show area corresponding to this specific item group is transmitted to the shopper as a guide map emphasizing the item show area as the object, for example. More concretely, the shopper inputs in advance the information on the items which he desires to purchase, at home by using a portable terminal, etc., takes this portable terminal to the store and makes an enquiry to an information processor of the store. This information processor decides the optimum or shortest route when watching the item show areas on the basis of the information received, and transmits it to the shopper. In this way, the shopper can obtain a guide map showing the item show area of the object items on the display of the portable terminal or on the printer. Particularly when the portable terminal and the information processor are allowed to communicate with each other by wireless, the information processor can detect the position of the portable terminal when the latter makes an enquiry to the former. Accordingly, the route from the position of the shopper to the desired item display area can be illustrated on this guide map.

BRIEF DESCRIPTION OF THE DRAWINGS

FIG. 2 is an explanatory view showing an example of a format of purchase information of the shopping system according to one embodiment of the present invention;

FIG. 6 is an explanatory view showing an example of edition of the home balance sheet file of the shopping system according to one embodiment of the present invention;

FIG. 10 is an explanatory view showing an example of screen display in purchase item decision in the shopping system according to one embodiment of the present invention;

FIG. 11 is an explanatory view showing an example of a format of item information in the shopping system according to another embodiment of the present invention;

FIG. 13 is a flowchart showing an example of a detailed purchase item decision procedure of the shopping system according to another embodiment of the present invention;

FIG. 14 is an explanatory view showing an example of screen display in purchase item decision in the shopping system according to another embodiment of the present invention;

FIG. 16 is a block diagram showing a system construction of still another embodiment of the present invention;

DESCRIPTION OF THE PREFERRED EMBODIMENTS

Figure 1:
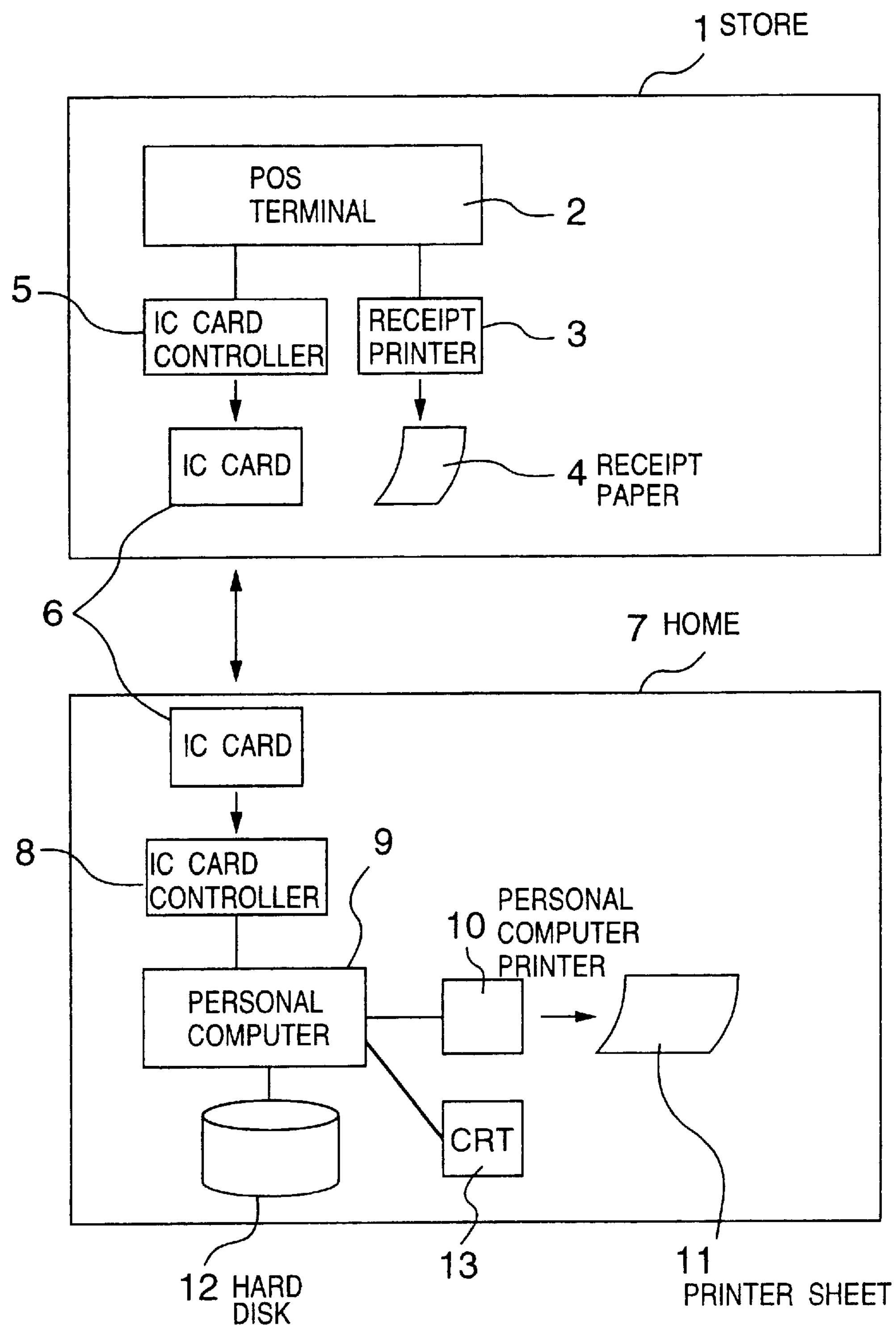
FIG. 1 is a block diagram showing an example of a shopping system according to an embodiment of the present invention.

Hereinafter, preferred embodiments of the present invention will be explained in detail with reference to the accompanying drawings. Incidentally, the same reference numeral will be used to identify a constituent element having the same function throughout the drawings and repetition of explanation of such a constituent element will be omitted.

(Embodiment 1)

This embodiment represents a shopping system which receives shopping information of items as item information from a store terminal, automatically works out a home balance sheet by a home terminal and further judges next purchase of the items.

FIG. 1 is a block diagram showing an example of the shopping system according to this embodiment. A POS (Point Of Sales) terminal 2 is provided as a store terminal in a store 1. An IC card controller 5 for reading and writing data of an IC card 6 and a receipt printer 3 for outputting a receipt paper (slip) 4 handed to a consumer (shopper) when the consumer purchases an item or items are connected to, or assembled in, this POS terminal 2. A portable terminal (such as a later-appearing handy terminal, etc.) capable of data exchange with the POS terminal 2 and a personal computer 9 can be used in place of the IC card 6. On the other hand, a personal computer 9 is provided to a home 7 as the home terminal. An IC card controller 8 for reading and writing the data of the IC card 6 described above, a personal computer printer 10 for outputting the processing result by the personal computer 9 to a printer sheet 11, a hard disk 12 for storing later-appearing purchase journal file, home balance sheet file, purchase history file, etc., and a CRT 13 for screen display are connected to, or assembled in, the personal computer 9.

When a consumer goes shopping in the store 1, the POS terminal 2 registers the item, and a receipt slip 4 is issued. At the same time, data relating to the purchase of the items is written into the IC card 6. If the receipt slip 4 is not outputted and only the data is written into the IC card 6, the system becomes a so-called "paperless system" and resources can be saved. The consumer takes back the IC card 6 to home, and the IC card controller 8 reads the purchase information and inputs it into the personal computer 9. The personal computer 9 merges this purchase information with the purchase journal file which has been stored already in the hard disk 12 and registers it to the hard disk 12.

FIG. 2 is an explanatory view showing an example of a format of the purchase information recorded into the IC card 6 which is used in the shopping system of this embodiment. The purchase information 20 comprises a header portion 21 to which the data and time of purchase is set, a detail portion 22 to which an item name 22*a* representing the name of the item, a unit price 22*b* representing the unit price of the item, a quantity 22*c* representing the quantity of the item and a sub-total 22*d* obtained by multiplying the unit price by the quantity are set, and a footer portion 23 to which the sum of the sub-totals is set, in the same way as the printed content of the receipt slip 4. The purchase journal file in the hard disk 12 shown in FIG. 1 has a similar format, and purchase information of the IC card 6 can be additionally written.

Figure 3A:
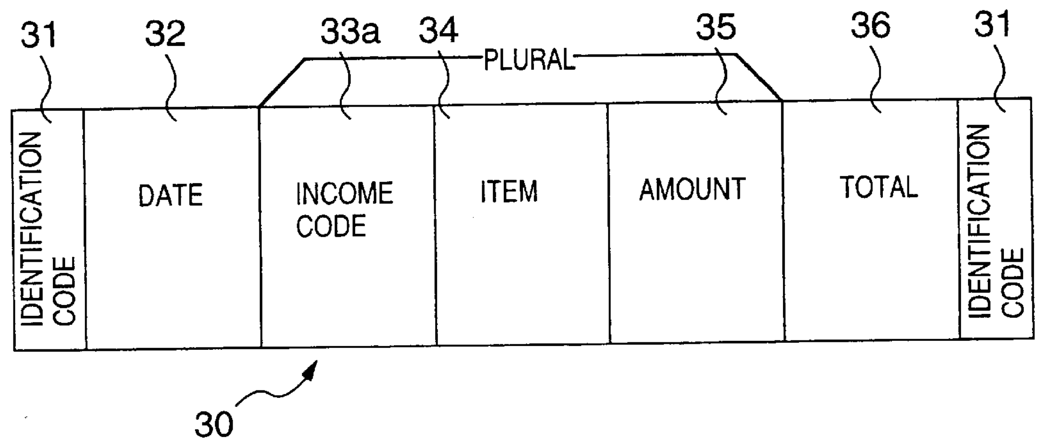
FIGS. 3A and 3B are conceptual views, each showing an example of a record format of a home balance sheet file of the shopping system according to one embodiment of the present invention.
Figure 3B:
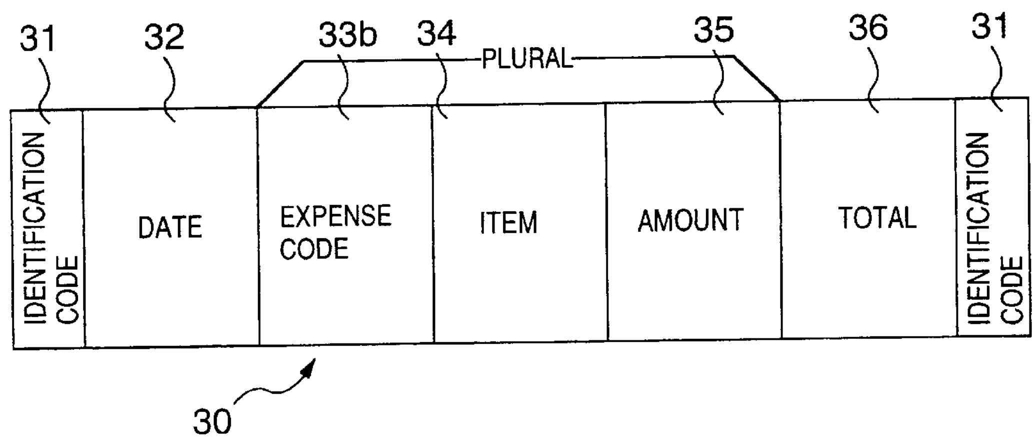

FIGS. 3A and 3B are conceptual views, each showing an example of a record format of a home balance sheet file inside the hard disk 12 shown in FIG. 1 and used for the shopping system of this embodiment. An identification code 31 representing the division of the home balance sheet record 30 is added to the start and the end of the home balance sheet file record 30. A data 32 representing the date of income/expenses, an income code 33*a* representing the income or an expense code 33*b* representing the expenses, an item 34 representing the detailed content of the income/ expenses, an amount 35 corresponding to the item and a total 36 for each date are set into the home balance sheet record 30. A plurality of codes can be set for each of the income code 33*a*, the expense code 33*b*, the item 34 and the amount 35 in accordance with the item, and when a plurality of codes are set as described above, the total is set as a total field after the number of times of shopping in accordance with the latter.

Figure 4:
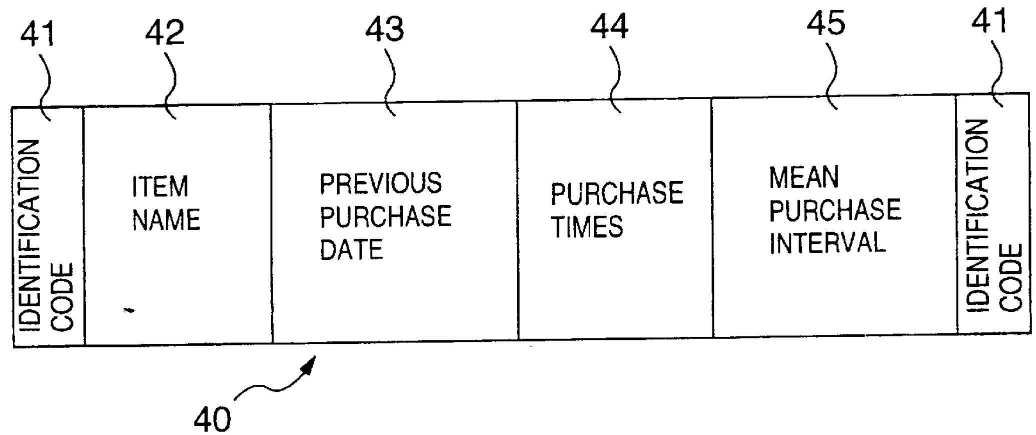
FIG. 4 is a conceptual view showing an example of a record format of a purchase history file of the shopping system according to one embodiment of the present invention.

FIG. 4 is a conceptual view showing an example of the record format recorded to the IC card 6 used when the purchase history file inside the hard disk 12 shown in FIG. 1 and used for the shopping system of this embodiment is edited. An identification code 41 representing the division of the purchase history file record 40 is added to the first and the end of the purchase history file record 40. An item name 42, a previous purchase date 43 representing the purchase date of a certain item, purchase times (previous number of times of purchase) of this certain item and a mean purchase interval 45 representing the cycle of the purchase of this certain item are set into the purchase history file record. A plurality of previous purchase dates 43 can be set in accordance with the number of times of purchase of the certain item.

Figure 5:
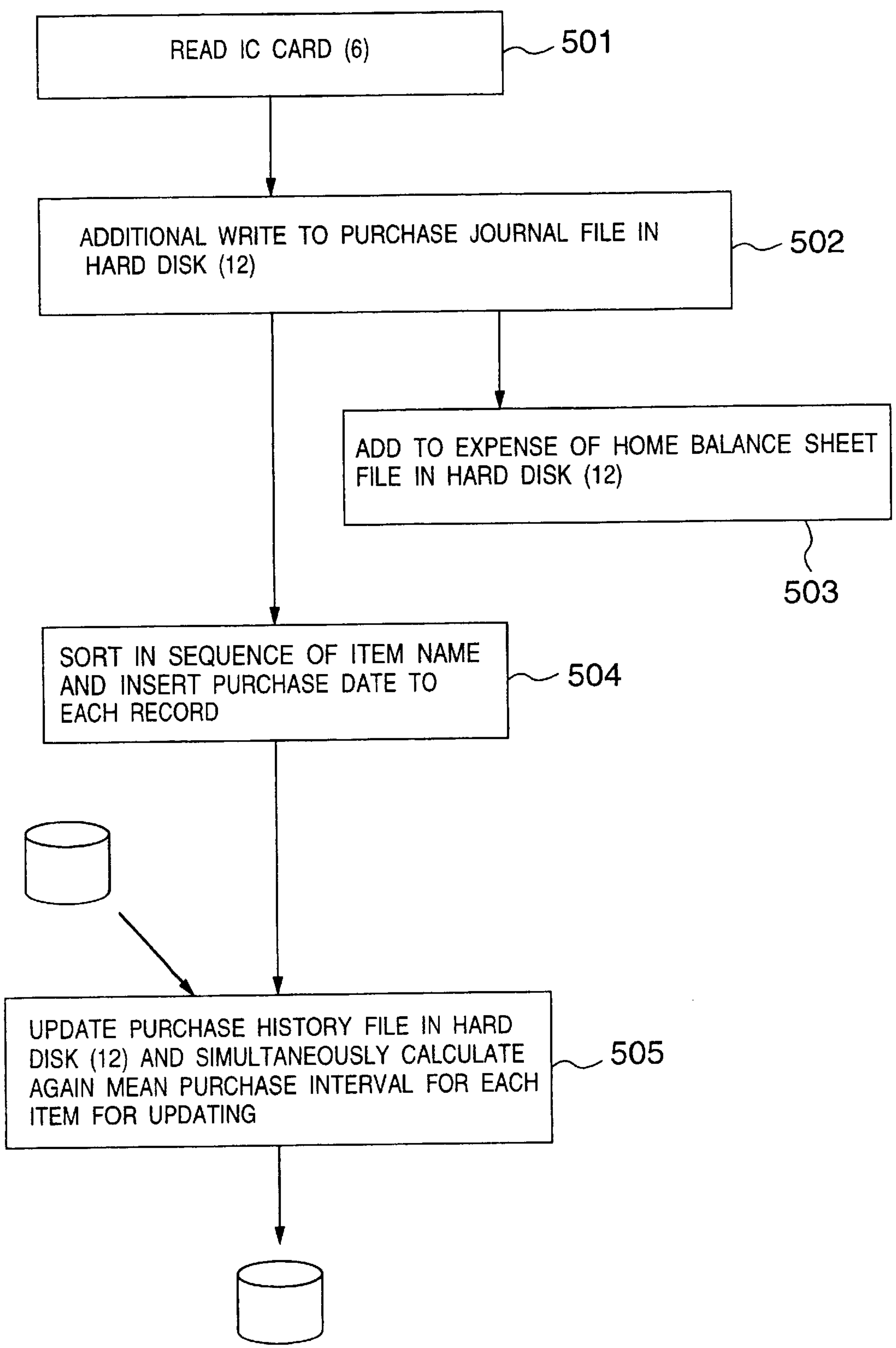
FIG. 5 is a flowchart showing an example of updating of the purchase history file of the shopping system according to one embodiment of the present invention.

FIG. 5 is a flowchart useful for explaining the operation of the shopping system according to the present invention after the purchase information on the item is written from the POS terminal 2 of the store 1 into the IC card 6. The flowchart particularly illustrates an example of the case where the personal computer 9 at home 7 reads the purchase information written into the IC card 6 and then updates the purchase history file inside the hard disk 12.

The personal computer 9 reads the purchase information stored from the POS terminal 2 into the IC card 6 in the format shown in FIG. 2, through the IC card controller 8 (step 501) and additionally writes this purchase information 20 into the purchase journal file inside the hard disk 12 (step 502). Next, the total amount set to the footer portion 23 of the purchase information 20 is added to the expense portion of the month in the home balance sheet file inside the hard disk 12 (step 503). On the other hand, the purchase information is read from the IC card 6, the date of the header portion 21 shown in FIG. 2 is set to the date 32 of FIG. 3B, the code representing the expense is set to the expense code 33*b* in FIG. 3B, the item name 22*a* and the sub-total 22*d* in FIG. 2 are set to the item 34 and the amount 35 in FIG. 3B, respectively, and the total amount of the footer portion 23 in FIG. 2 is set to the total 36 in FIG. 3B (step 504).

An item name coinciding with the item 34 of FIG. 3 in the purchase history file inside the hard disk 12 is retrieved by looking up the new record edited in this way, and the purchase file record 40 of this item is updated if such an item exists. If it does not, the item is added afresh. At this time, the mean purchase interval 45 for each item 42 is also calculated again simultaneously (step 505).

FIG. 6 is an explanatory view showing an example of an edited home balance sheet file inside the hard disk 12 used for the shopping system according to this embodiment. In this home balance sheet file, an income/expense balance 60 for representing the income/expenses for each month comprises a month 64 representing this month, an income 61 representing the content of income, an expense 62 for representing the content of expenses and a remainder 63 representing the remainder of this month. Each of the income 61 and the expense 62 is provided with a date 61*a,* 62*a,* an item 61*b,* 62*b* representing the kind of the income/expense, an amount 61*c,* 62*c* for representing the total amount for each item, and a total 61*d,* 62*d* for representing the total amount of the amounts 61*c,* 62*c.*

Here, the generation of the home balance sheet shown in FIG. 6 when the consumer makes "purchase" in the store 1 (step 503 in FIG. 5) will be explained in detail with reference to a concrete example. First, the consumer causes the IC card controller 8 to read the purchase information 20 stored in the IC card 6 and shown in FIG. 2. The personal computer 9 puts a generic name "shopping", in this case, to the date "2/20" set to the header portion 21 corresponding to each of the date 62*a,* the item 62*b* and the amount 62*c* of the expenses 62 of FIG. 6 and to the items, though the individual item name may be used, merges the total amount "3,294" set to the footer portion 23 and stores it in the home balance sheet file. In this way, the purchase information 20 received from the POS terminal 2 is added and gathered to the so-called "home balance sheet information" classified in accordance with the month inside the hard disk 12, and entry of the home balance sheet can be thus automated.

Figure 7:
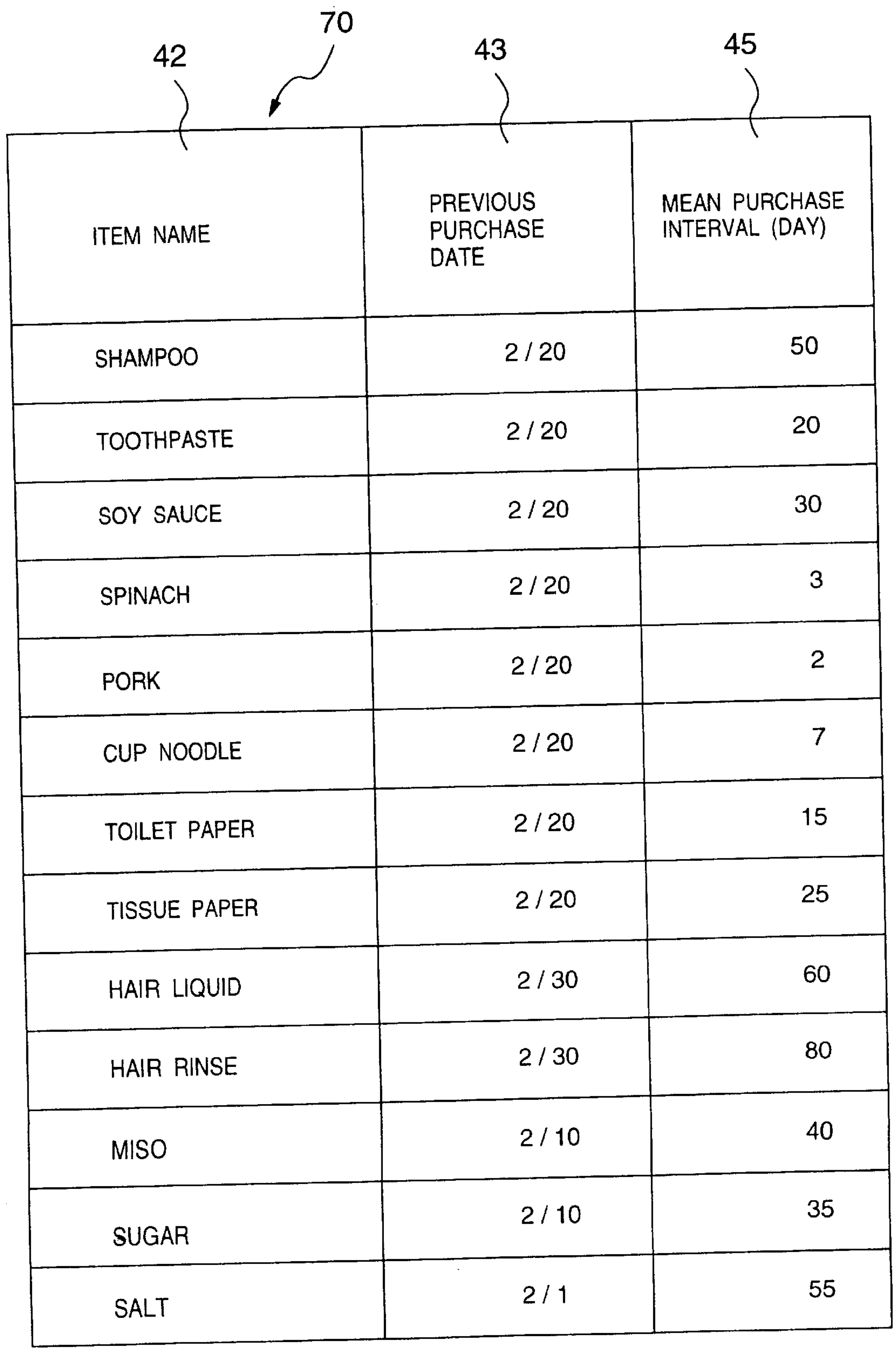
FIG. 7 is an explanatory view showing an example of the purchase history file of the shopping system according to one embodiment of the present invention.

FIG. 7 is an explanatory view showing an example of the purchase history file inside the hard disk 12 used for the shopping system of this embodiment. This purchase history file 70 utilizes the purchase information 20 from the past to the present, and is constituted by editing and setting the mean purchase interval 45, etc., obtained by calculating the previous purchase date 43 and the number of times of purchase in the past for each of the items 42 that have been purchased up to the present. In the table, only the latest date is used as the previous purchase date 43 such as "2/20, 2/10, etc." for each item 42, e.g. shampoo, miso, etc., and the mean purchase interval 45 is determined by a simple arithmetic mean value "50, 40, etc.". However, a plurality of past purchase dates are preferably prepared so that the history can be retrospectively analyzed if statistical analysis is applied by using an index distribution, a Poisson's distribution, an error distribution, etc., as a model function, in place of the simple arithmetic means. Among these statistical distribution functions, the index function which can be applied to a queue model is particularly preferred for this embodiment. Further, a similar effect can be obtained by using reasoning means which takes the time change of the purchase record into consideration, by introducing a time parameter into the past purchase history information.

Figure 8:
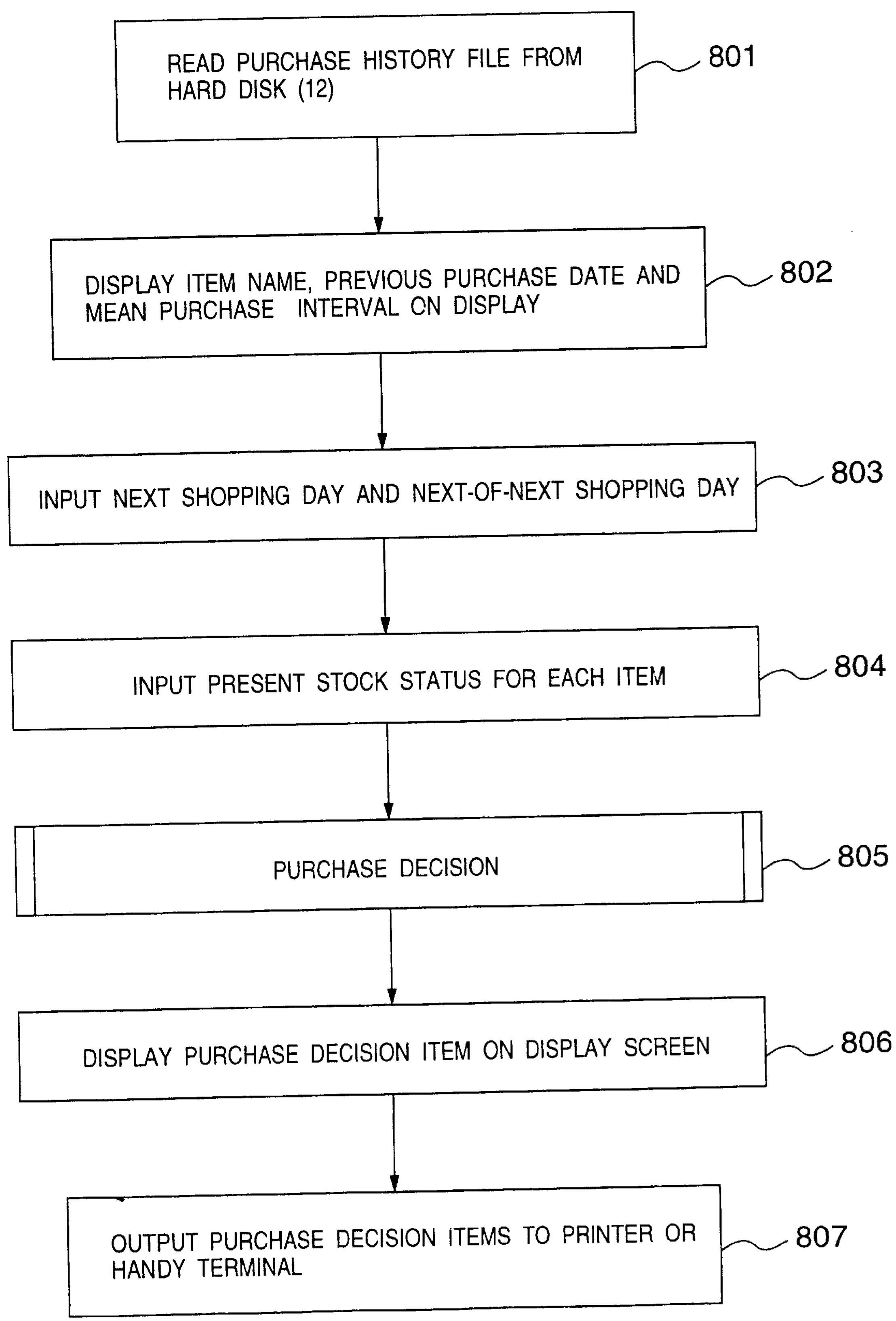
FIG. 8 is a flowchart showing an example of the outline of a purchase item decision procedure of the shopping system according to one embodiment of the present invention.
Figure 9:
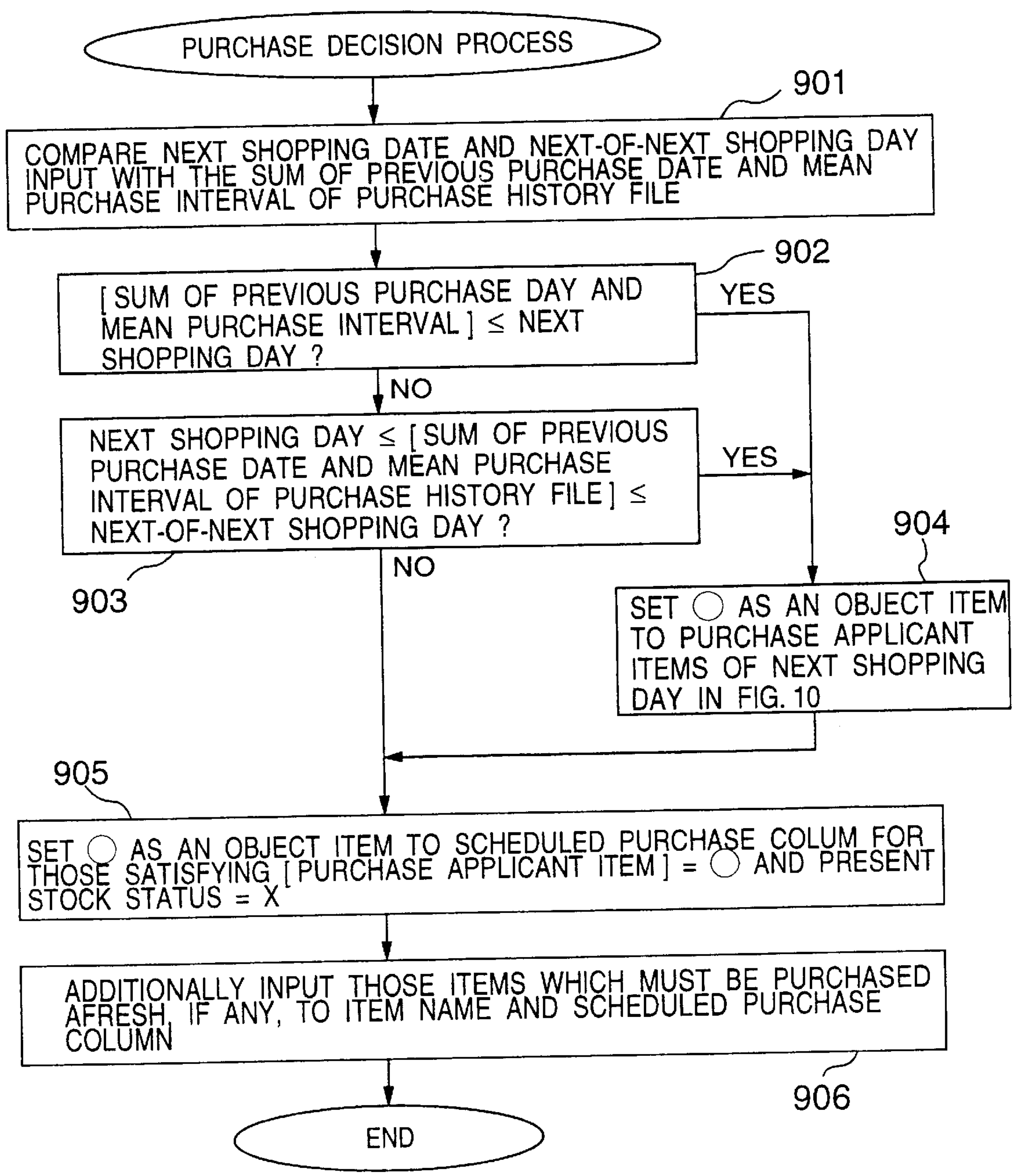
FIG. 9 is a flowchart showing an example of the detail of the purchase item decision process according to the purchase item decision procedure of the shopping system according to one embodiment of the present invention.

FIG. 8 is a flowchart showing an example of the outline of logic for determining purchase items, which is used for the shopping system of this embodiment. FIG. 9 is a flowchart particularly showing an example of the detailed logic of the purchase item determination process in FIG. 8 among the purchase item determination logic used for the shopping system of this embodiment, and FIG. 10 is an explanatory view showing an example of screen display in purchase item determination used for the shopping system of this embodiment.

First, the outline of the logic till determination of desired items by using the personal computer 9 as the home terminal will be explained with reference to the flowchart of FIG. 8.

The personal computer 9 reads the purchase history file 70 shown in FIG. 7 from the hard disk 12 (step 801). The item name 42, the previous purchase date 43 and the mean purchase interval 45 so read from the purchase history file 70 are displayed on the screen of the CRT 13 connected to the personal computer 9 as shown in FIG. 10 (step 802). Though items other than those explained with reference to FIG. 7 are shown displayed in FIG. 10, they are not yet displayed at the present stage. The number of times of purchase 44 of the purchase history file record 40 in the data format of the IC card 6 can be stored in the purchase history file 70, but it needs not be necessarily displayed on the CRT 13 because it is used only to determine the mean purchase interval 45. Next, the consumer inputs the next shopping day 101 "3/20" and the next-of-next shopping day 102 "4/10" from the keyboard connected to the personal computer 9 (step 803). Next, the present stock status 107 of each item is inputted from the keyboard. In this instance, symbol "○" is inputted if the stock status of the item is sufficient and "X" if the stock status is nil or small (step 804). The personal computer 9 executes purchase decision process on the basis of the information described above (step 805). As a result, either "○" or "X" is displayed as purchase decision 108 on the CRT 13 (step 806). This result is outputted by the personal computer printer 10 or by the later-appearing handy terminal (step 807).

Next, the detailed procedure of purchase decision process at step 805 explained with reference to FIG. 8 will be explained on the basis of the display screen of FIG. 10 with reference to the flowchart of FIG. 9. The sum of the date of the previous purchase date 43 of the purchase history file 70 and the date of the mean purchase interval 45 is compared with the next shopping date 101 "3/201" and the next-of-next shopping date 102 "4/101" inputted from the keyboard (step 901). Next, whether or not the date as the sum of the previous purchase date 43 of the purchase history file 70 and the mean purchase interval 45 is established before the next shopping date 101 is compared (step 902), and whether or not the date as the sum of the previous purchase date 43 of the purchase history file 70 and the mean purchase interval 45 can be established after the next shopping date 101 and before the next-of-next shopping date 102 is compared (step 903). Further, whether or not the possibility of the absence of stock exists is checked. When either one of the steps 903 and 904 is established, "○" is set as the scheduled purchase object to the next shopping scheduled item 106 (step 904). The symbol "○" is set as the purchase object item to the purchase decision 108 for those items which have the mark "○" in the next shopping scheduled item 106 and "X" in the present stock status (step 905). Finally, when a new item which is not displayed is to be purchased, the name of the item may be added to the item name 42 and the purchase decision 108 in the display of FIG. 10 (step 906).

The symbols "○" and "X" are displayed in the purchase decision 108 as the result of the flows in FIGS. 8 and 9, and the item having the symbol "○" is decided as the item to be next purchased. The information in FIG. 10 so decided is printed on the printer sheet 11 or is outputted to the later-appearing handy terminal so that the consumer can make shopping by looking up this information in the store 1.

The shopping system according to this embodiment eliminates the necessity for posting to the home balance sheet by looking up the receipt slip 4 whenever shopping is made or the necessity for type input to the home balance sheet software, and can eliminate posting errors and input errors. Because the next purchase items are decided by looking up the past purchase history information and the present stock status, it becomes possible for the consumer to prevent the shopping error of the items which must be purchased and the overlap purchase of the items which are kept in stock and need not be purchased.

(Embodiment 2)

Embodiment 1 explained above represents the case where the item information received from the POS terminal relates only to the purchase information of the items. This embodiment illustrates the case where the item information including the sale information on bargain sale in addition to the purchase information of the items is received from the POS terminal, and efficient item purchase is made on the basis of this information.

However, the construction of the shopping system, the purchase journal file, the purchase history file, the home balance sheet file, etc., are the same as those used in Embodiment 1, and only the different construction from Embodiment 1 will be explained.

Figure 12:
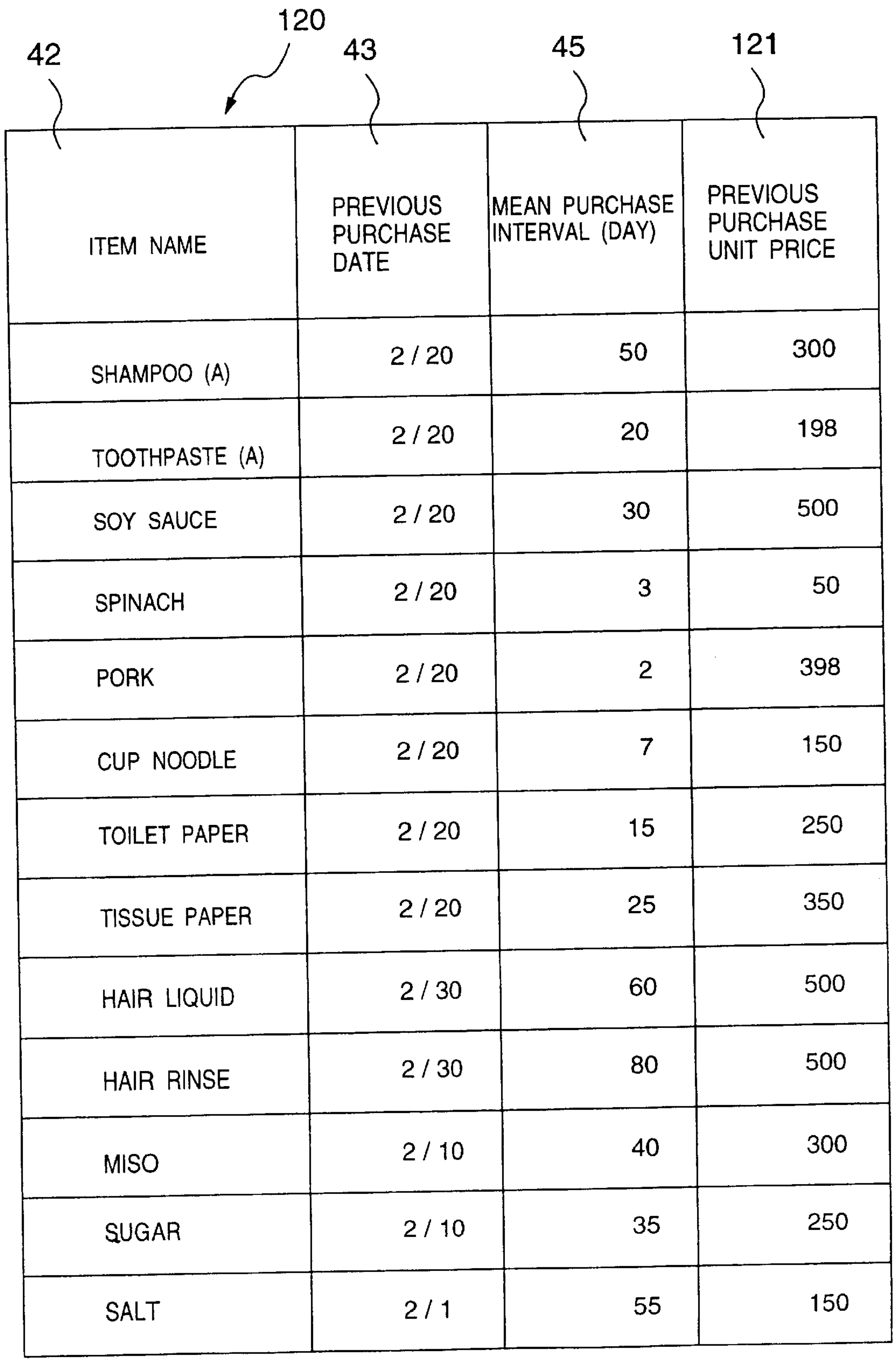
FIG. 12 is an explanatory view showing an example of the purchase history file of the shopping system according to another embodiment of the present invention.

FIG. 11 is an explanatory view showing an example of the format of item information (obtained by adding sale information to the purchase information of Embodiment 1) used for the shopping system of this embodiment, and FIG. 12 is an explanatory view showing an example of the purchase history file of the hard disk 12 used for the shopping system. As described above, the item information includes the sale information 24 on the sales of the items in addition to the purchase information 20 described in Embodiment 1, and a sales item 24*a*, a sale price 24*b* and the period 24*c* of the sales item are set to this sale information 24. First, the purchase journal file and the home balance sheet file are generated on the basis of the purchase information 20 in the same way as in Embodiment 1, but the purchase history file 120 includes the previous purchase prices 121 in addition to the item name 42, the previous purchase date 43 and the mean purchase interval 45 explained with reference to FIG. 7. The outline of the logic for deciding desired items on the basis of this purchase history file 120 is the same with the exception of the purchase item decision process (step 805) explained already with reference to FIGS. 8 and 9.

Hereinafter, the process for deciding the purchase items of the shopper when the sale information 24 added to the purchase information is taken into consideration will be explained in detail.

FIG. 13 is a flowchart used for the shopping system of this embodiment and showing an example of the procedure of the detailed purchase item decision process different from Embodiment 1, and FIG. 14 is an explanatory view showing an example of screen display in purchase item decision used for this shopping system. Though FIG. 13 is the flowchart up to decision of the desired purchase item(s) on the basis of the purchase history file 120 shown in FIG. 12, steps 901 to 905 are the same as those of the flowchart of FIG. 1 explained with reference to Embodiment 1 and the explanation of these steps will be omitted.

The personal computer 9 refers to the sales item 24*a* of the sale information 24 acquired from the IC card 6 and shown in FIG. 11, retrieves the item name 42 among the items 42 of the purchase history file 120 having the mark "○" representing purchase decision, by the process of step 905 of FIG. 13. If the corresponding item exists in the sale item names 24*a*, the personal computer 9 compares the previous purchase prices 121 of the item with the sales price 24*b* of the sale information 24 (step 907). Next, if the next shopping date 101 is within the object period 24*c* of the sale information 24 and the item contained in the sale information is more advantageous in price, the symbol "○" in the purchase decision 108 is updated to "X" and the purchase decision 109 in the sale information 24 is set to "○" (step 908), so as to prevent the purchase of the item which is not a sales item. Here, if the item which is more advantageous than the item to be purchased does not exist in the sale information 24, the flow proceeds to step 906.

Referring to the item information shown in FIG. 11, a "toothpaste (B)" in the sale information 24 is more advantageous in price than a "toothpaste (A)" and moreover, the next shopping day is within the object period. Therefore, the purchase decision 108 of the "toothpaste (A)" changes to "X" and the purchase decision of the sales item "toothpaste (B)" changes to "○" from the process shown in FIG. 13 to the example of the display screen in FIG. 14. Accordingly, the shopper purchases the "toothpaste (B)" from this display screen. When an item not existing in the display is purchased, the name 42 of this item is added to the item 42 and the purchase decision 108 at step 906 in the same way as in Embodiment 1.

The shopping system according to this embodiment can decide not only the purchase item on the basis of the purchase history information but can also decide rational purchase items in accordance with future sale information by referring to the sale information 24. Accordingly, the shopper can purchase more economical items. Because the sellers can pass quickly and effectively the sale information to the consumers, they can rationally establish the management planning such as sale, distribution, etc.

Though the name of each item is judged so as to conduct purchase decision in Embodiments 1 and 2, a process for executing judgement in a group unit can be made by adding a section code such as "toothpastes" to the toothpaste and "seasonings" to soy sauce, without using the individual item name.

(Embodiment 3)

Embodiments 1 and 2 represent the case where the personal computer 9 is used for process as the home terminal. Next, an example where a portable information terminal such as a handy terminal equipped with process functions and display functions will be explained.

Figure 15:
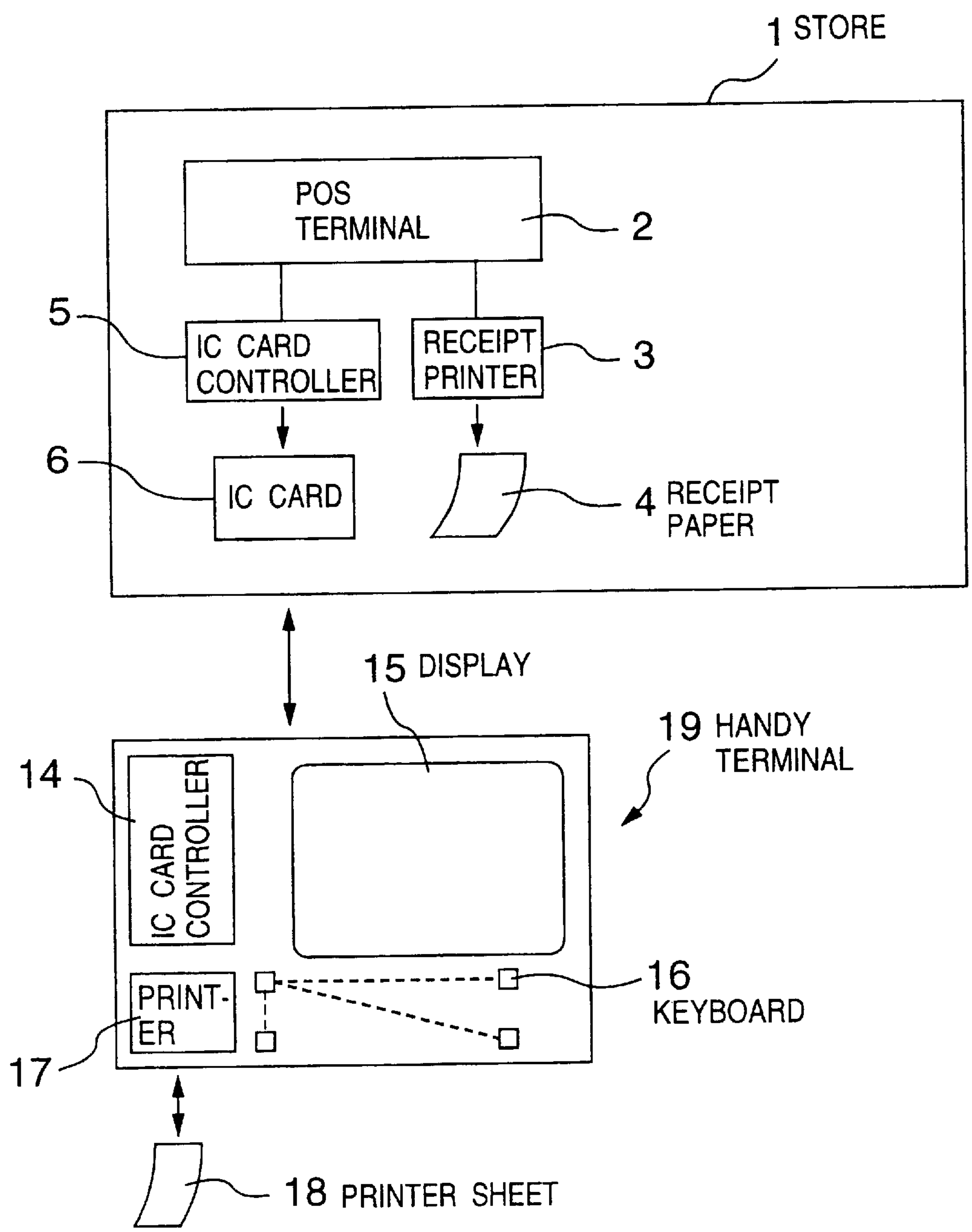
FIG. 15 is a block diagram showing an example where a portable information terminal is used for the shopping system according to still another embodiment of the present invention.

FIG. 15 is a block diagram showing an example where a portable information terminal is used for the shopping system of this embodiment. In this shopping system, the item information such as the purchase information, the sale information, etc., can be transferred from the POS terminal 2 equipped with the receipt printer 3 for outputting the receipt sheet 4 and with the IC card controller 5 for controlling the IC card 6. As will be later described, however, wireless data transfer can be also made without using the IC card 6. This handy terminal 19 includes a built-in IC card controller 14 for controlling the IC card 6, a printer 17 for outputting the printer sheet 18, a display 15 and a keyboard 16. The handy terminal 19 further includes a memory device corresponding to the hard disk 12 (not shown) so as to store the afore-mentioned purchase journal file, home balance sheet file, purchase history file, and so forth. Because the handy terminal 19 has these functions and devices, it can execute processings which are executed by the personal computer 9 at home 7 in Embodiments 1 and 2 without carrying back the information to home 7. Incidentally, the item information from the POS terminal 2 can be directly transferred by wireless transmission to the personal computer 9 through a suitable interface without using the IC card 6.

When such a handy terminal 19 is used, the process can be executed while the shopper makes shopping at other counters or other shops without executing various processes at home 7, and the shopper can consecutively make shopping while referring to the decision result of the items to be purchased.

(Embodiment 4)

Next, a shopping system having high extensibility and versatility obtained by adding other functions to the shopping system using this portable information terminal will be explained. More concretely, the function of allowing the shopper to recognize his own position inside the store and the function of guiding the shopper to a show area by associating the shopping item with a corresponding shelf are added to the handy terminal shown in FIG. 15 so that the shopper can purchase the items without omission along a rational shopping route and can save both troubles and time. Furthermore, this shopping system can mitigate congestion inside the store.

Next, this embodiment will be explained with reference to the drawings.

FIG. 16 shows the construction of the shopping system according to this embodiment. A handy terminal 19 and an antenna 46 for transmitting and receiving data from an electronic shelf label 51 are provided at suitable positions inside the store 1 shown in FIG. 1. Transmitter/receiver 47 are connected to the antenna 46, respectively. The transmitter/receiver 47 are connected to a store processor 48 through transmission lines such as bus lines. This store processor 48 includes a plurality of POS terminals 2 shown in FIG. 1 and connected by the same transmission line, collectively controls these POS terminals 2, includes also an item information data base 49 for storing item information and can make access to this data base. Both of the handy terminal 19 and the electronic shelf label 51 have respective physical addresses on the circuit line and can operate as one terminal on the circuit line. Besides the keyboard 16 for inputting the item information which is substantially similar to the function explained with reference to FIG. 15, the display 15 for displaying reply data from the store processor 48 and the printer 17 for printing the reply data, the handy terminal 19 is equipped with an antenna 52 for transmitting and receiving the data with the store processor 48. The electronic shelf label 51 is disposed at each display area 50, sets and displays electronically the shelf position in accordance with the kind of the item, and is generally known as the "electronic shelf label". The handy terminal 19 includes a keyboard for inputting this electronic shelf label 51. The name of the item inputted (e.g. spinach) and the position information of the shelf at which the item is displayed are stored and displayed in such a manner as to correspond to each other. When the shelf position is changed by changing the position of the item, the content of this change is transmitted wirelessly to the store processor 48. The handy terminal 19 may include a bar code reader in place of the keyboard for inputting the item name so as to convert an item code to the item name by reading the bar code allocated to the item.

Figure 17:
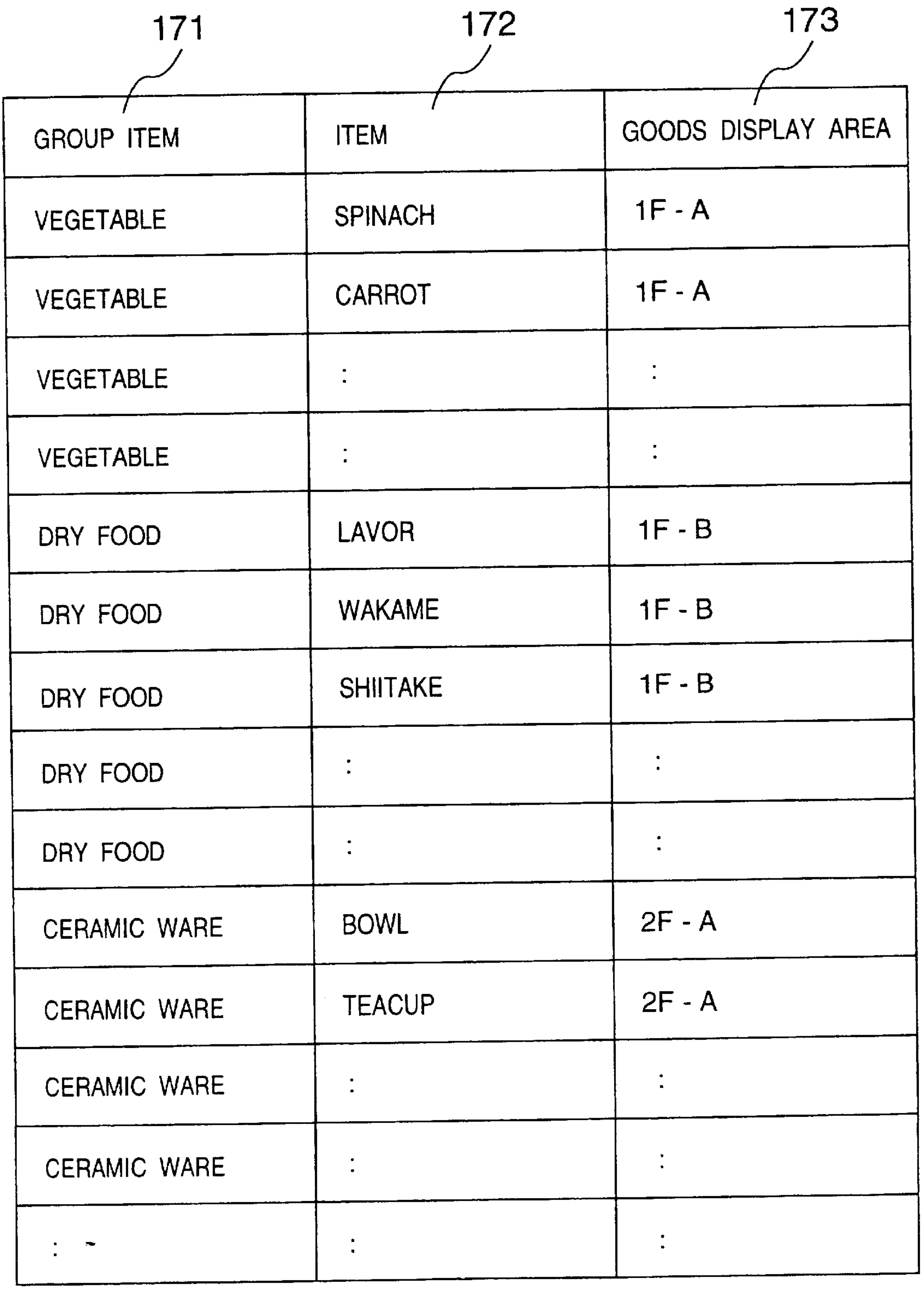
FIG. 17 is a table showing an example of a data format of a data base according to the present invention.

FIG. 17 shows an example of the data format stored in the item information data base 49. As shown in this drawing, the information relating to the classification of the items such as a group item 171 and an item 172 and the information relating to the show area are stored as one record in the item information data base 49 in such a manner as to correspond to each other. The group item 171 stores a group item such as "vegetables", "dry goods", etc., and the item 172 stores detailed items such as "spinach", "carrot", etc. The show area 173 stores the positions at which the items are displayed, such as the floor and the shelf position "lF-A", "lF-B", etc. Here, the items belonging to one group item 171 are concentratedly displayed at one position or at several positions close to one another. In other words, the display area (the show area), 173 of the items belonging to one group item 171 is concentrated on one show area or several show areas close to one another so that the shopper can easily make shopping.

When the information on the item name and its shelf position is sent from the electronic shelf label 51 to the store processor 48 through the antenna 46, the transmitter/receiver 47 and the transmission line, the store processor 50 detects the floor at which the display area (show area) 50 exists from the position of the antenna 46 receiving this information, retrieves the items of the item 172 of the item information data base 49 by using the received item name as the key, changes the shelf position of the goods display area (the show area) 173 of the corresponding record and updates the data format stored in the item information data base 49 and shown in FIG. 17.

On the other hand, when the item information designating the group item 171 or the item 172 is sent from the handy terminal 19 through the antenna 52, the antenna 46 and the transmitter/receiver 47, the store processor 48 retrieves the group item 171 or the item 172 stored in the item information data base 49 by using the item information as the key and returns the desired data to the handy terminal 19. When retrieving the group item 171 or the item 172 of the item information retrieval sometimes results in failure due to the differences in katakana, hiragana and okuriqana or due to the input error of English spelling, but such a problem can be improved by utilizing a known reasoning technique because the object of the retrieval is limited to the item information dealt with in the store.

Figure 18:
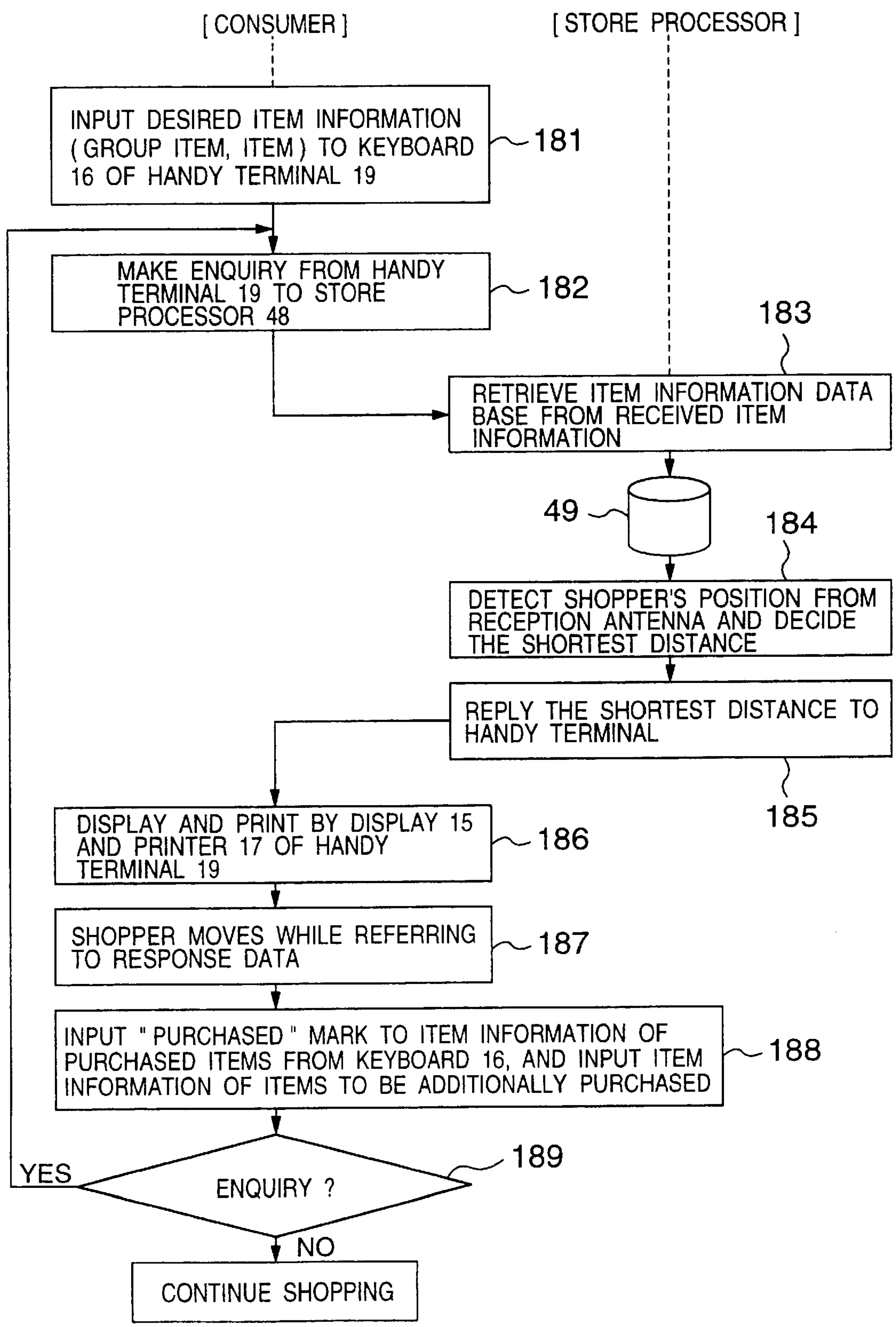
FIG. 18 is a flowchart showing the flow of a process in the embodiment shown in FIG. 16.

FIG. 18 is a flowchart showing the method of information process and information delivery for each of the handy terminal 19 and the store processor 48 when the shopper makes shopping in the store 1 by using the shopping system of this embodiment. Hereinafter, the explanation will be given in detailed with reference to this flowchart.

First, the shopper inputs the item information of the item be wishes to purchase from the keyboard 16 of the handy terminal 19. At this time, either one, or both, of the group item 171 and the item 172 corresponding to FIG. 17 are designated as the input item information (step 181). Then, the handy terminal 19 makes enquiry to the store processor 48 through the antenna 52, the antenna 46 and the transmitter/receiver 47 (step 182). The enquiry method at this time can designate only one item, a plurality of items or only the group item 171. Receiving such an item information, the store processor 48 retrieves the item information data base 49, and replies the data stored in the show area 173 corresponding to the designated item or the item group to the handy terminal 19 (step 183).

Further, the store processor 48 detects the position of the shopper, that is, the position of the handy terminal 19, from the antenna 52 receiving the item information, decides the optimum (shortest) shopping route reaching the object show area from the information on the show area 173 so retrieved and on the position of the shopper so detected (step 184) and sends the optimum (shortest) route to the handy terminal 19 (step 185). The handy terminal 19 displays and prints the data so fed back on the display 15 and the printer 17, respectively (step 186). It will be more convenient for the shopper if the show area 173 in the store and the optimum (shortest) route is displayed or printed in the form of the guide map by an image. In this way, the shopper can move and make shopping by referring to the optimum (shortest) route as the reply data (step 187).

When purchasing an item while walking in the store, the consumer inputs a mark representing the purchase to the item information on the purchased item among the item information displayed on the display 15, from the keyboard 16. When an item or items to be additionally purchased occur, too, the item information is similarly inputted from the keyboard 16 and added to the item information that has been already inputted (step 188). When enquiry is made at this point (step 189), the flow returns to step 182 and the store processor 48 determines the show area 50 of the items other than those which have been already purchased and the shortest route reaching this show area 50 from the item information to which the purchase mark is put, from the added item information and from the present position of the shopper, and then replies again to the handy terminal 19 (steps 182 to 185). Incidentally, it is also possible to automatically make enquiry through the antenna 46 whenever the shopper moves without causing the shopper to make enquiry through the handy terminal 19 whenever the operation is made. In other words, the store processor 48 stores the terminal identification code of the handy terminal 19 whenever enquiry is once made from the handy terminal 19, executes poling in a predetermined cycle, detects the position of the handy terminal 19 (the position of the shopper), and displays the latest shopping route on the display 15 in accordance with the position of the shopper.

Figure 19A:
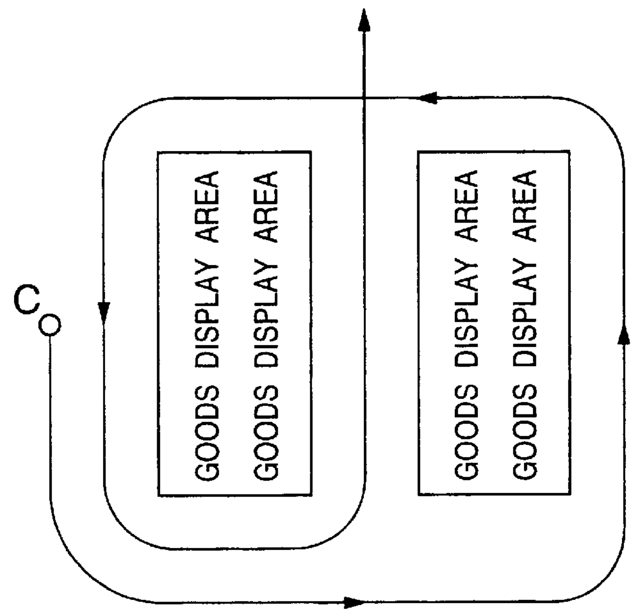
FIGS. 19A and 19B are explanatory views, each showing an example of a route along goods display areas (item show areas).
Figure 19B:
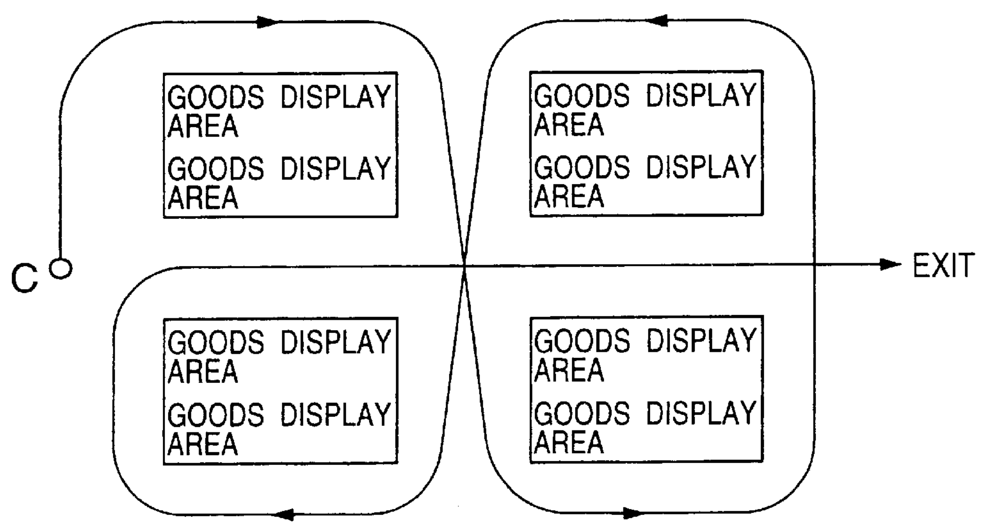

The method of deciding the shortest shopping route explained at step 184 can be accomplished by a method of determining the shortest distance which is known in automatic wiring of computers. For example, a route covering all the display areas (the show areas) 50 is advance determined as shown in FIGS. 19A and 19B. Symbol C in FIG. 19 represents the position of the shopper. If the information of the show area 50 and the information on the position of the shopper are encoded in such a manner as to establish this route, the shortest distance along a predetermined route can be decided by executing sorting by adding the position information of the shopper to the item information enquired by the consumer. However, if the show area as the object of shopping is small such as one show area, the shortest distance to the object show area is selected while keeping a predetermined route and an intermediate route of the predetermined route is omitted. In any way, a route in the opposite direction to the predetermined route is minimized and the shortest distance is selected by applying the known technique.

Though this embodiment uses the input operation from the keyboard 16 as the inputting method from the handy terminal 19, other input means such as a bar code reader can be employed, as well, and the item code can be inputted in advance at home when the shopper consecutively purchases the same item that has been already purchased. The item information may be inputted by handwriting by providing an electronic pen to the handy terminal 19. Though the mark representing purchase is inputted from the keyboard in this embodiment, a touch-panel system can be employed, too, by replacing the display 15 by a touch panel and touching the item name(s) of the purchased item(s) on the table of the item names to be purchased. The item name in the embodiment may be replaced by the item code. The information representing the correspondence between the item name and the rack position may be loaded down to the electronic shelf label 51 from the store processor 48 without inputting it from the electronic shelf label 51 but in this case, this information is maintained in the store processor 48. In the embodiment described above, further, the electronic shelf label 51 is provided and when the show area 50 of the items is changed, the content of the change is sent to the store processor 48 so as to update the item information data base 49. However, the content of the item information data base 49 may be updated through input means connected to the store processor 48 without disposing the electronic shelf label 51.

As described above, Embodiment 1 represents the shopping system which automatically generates the home balance sheet and which prevents the oversight of the shopping items and overlap purchase of the item which is kept in stock and needs not be purchased, Embodiment 2 represents the shopping system which can rationally purchase more economical items (sales items) on the basis of the sale information, Embodiment 3 represents the shopping system which uses the handy terminal as a portable terminal with a built-in IC card controller in place of the personal computer as the home terminal, and Embodiment 4 represents the example of the handy terminal equipped with the wireless circuit in place of the IC card, and which is particularly effective for deciding the shortest shopping route in a large scale store. Although each of these embodiments has been explained dividedly for the purpose of simplification, they can be combined in various ways without departing from the scope of the invention, and a shopping system which is rational to both the shopper and the store can be obviously constituted by the invention.

What is claimed is:

1. A home terminal for editing information on purchase and sale items, comprising:

transmission/reception means for receiving item information on items;

input means for inputting desired data;

memory means for acquiring and storing purchase history data regarding the past purchase of items among said item information received from said transmission/reception means;

process means for comparing data from said input means with said purchase history data stored in said memory means, and determining an item or items to be purchased; and output means for outputting the result of the item or items determined to be purchased by said process means, wherein:

said memory means acquires the purchase history data regarding the past purchase of each item included among said item information obtained from said transmission/reception mean, and stores a cycle obtained by determining the means of the purchase interval of the items from said purchase history data; and said process means determines the mean of said purchase interval; compares a next purchase day of a certain item input from said input means, a succeeding next purchase day of said item, a stock status representing the stock of said item, and the sum of the previous purchase date of said item stored in said memory means and the mean of the cycle of said purchase interval, using predetermined logic; and decides the items which must be purchased.

2. A home terminal according to claim 1, wherein:

said memory means stores sales information of sales items in the store among said item information acquired from said transmission/reception means of said home terminal;

said process means retrieves object sales items stored in said memory means from among said items whose purchase is decided, and decides whether or not said sales items can be purchased from said sale information of said retrieved sales items; and said output means outputs the decision result of said purchasable sales items.

3. A home terminal according to claim 1, wherein:

said transmission/reception means of said home terminal reads a desired one of said item information from a written medium.

4. A home terminal according to claim 3, wherein:

said transmission/reception means of said home terminal is IC control means; and said medium is an IC card.

5. A home terminal according to claim 4, wherein:

said home terminal is a portable terminal which a shopper can carry.

6. A home terminal according to claim 1, wherein:

said home terminal is a portable terminal which a shopper can carry; and said transmission/reception means of said portable terminal is an antenna enabling transmission/reception of said item information by wireless.

7. A home terminal for editing information regarding purchase and sale of items, comprising;

transmission/reception means for receiving item information regarding items;

input means for inputting desired data;

memory means for acquiring and storing sale information regarding sales items in a store among said item information received from said transmission/reception means;

process means for retrieving sales information regarding object sales items stored in said memory means among applicant purchase items of the shopper input from said input means, and deciding whether or not said object sale items can be purchased from said retrieved sale information regarding said object sales items; and output means for outputting the result of said purchasable sales items decided by said process means, said memory means acquires the purchase history data regarding the past purchase of each item included among said item information obtained from said transmission/reception means, and stores a cycle obtained by determining the mean of the purchase interval of the items from said purchase history data; and said process means determines the mean of said purchase interval compares a next purchase day of a certain item input from said input means, a succeeding next purchase day of said item, a stock status representing the stock of said item, and the sum of the previous purchase date of said item stored in said memory means and the mean of the cycle of said purchase interval, using predetermined logic; and decides the items which must be purchased.

8. A home terminal according to claim 7, wherein:

said transmission/reception means of said home terminal reads a desired one of said item information from a written medium.

9. A home terminal according to claim 8, wherein:

said transmission/reception means of said home terminal is IC control means; and said medium is an IC card.

10. A home terminal according to claim 9, wherein:

said home terminal is a portable terminal which a shopper can carry.

11. A home terminal according to claim 7, wherein:

said home terminal is a portable terminal which a shopper can carry about; and said transmission/reception means of said portable terminal is an antenna enabling wireless transmission/reception of said item information.

* * * * *